(12) United States Patent
Christensen et al.

(10) Patent No.: US 7,478,402 B2
(45) Date of Patent: Jan. 13, 2009

(54) CONFIGURABLE MESSAGE PIPELINES

(75) Inventors: Erik B. Christensen, Seattle, WA (US); Michael J. Coulson, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 785 days.

(21) Appl. No.: 10/778,553

(22) Filed: Feb. 12, 2004

(65) Prior Publication Data

US 2005/0183092 A1 Aug. 18, 2005

(51) Int. Cl.
*G06F 3/00* (2006.01)
*G06F 15/16* (2006.01)
(52) U.S. Cl. .................................. 719/313; 709/231
(58) Field of Classification Search ............... 719/313; 709/231
See application file for complete search history.

(56) References Cited

U.S. PATENT DOCUMENTS

| | | | |
|---|---|---|---|
| 4,984,237 A | | 1/1991 | Franaszek |
| 5,471,626 A | * | 11/1995 | Carnevale et al. ........... 712/219 |
| 6,259,461 B1 | * | 7/2001 | Brown ........................ 345/556 |
| 7,127,520 B2 | * | 10/2006 | Ladd et al. .................. 709/231 |
| 2003/0212926 A1 | | 11/2003 | Bhat et al. |
| 2003/0233477 A1 | | 12/2003 | Ballinger et al. |

OTHER PUBLICATIONS

Masaki Wakabayashi, ISIS: Multiprocessor Simulator Library, Feb. 1999.*
Wu, Chun-Hsin et al., "The Design and Implementation of Intelligent Transportation Web Services," Proceedings IEEE International Conference on E-Commerce, CEC 2003, USA, pp. 49-52.
Tsalgatidou, Aphrodite et al., "An Overview of Standards and Related Technology in Web Services," Distributed and Parallel Databases, vol. 12, No. 2-3, Sep.-Nov. 2002, The Netherlands, pp. 135-162.
Min, Geyong et al., "A Comparative Study of Switching Methods in Multicomputer Networks," The Journal of Supercomputing, vol. 21, No. 3, Mar. 2002, The Netherlands, pp. 227-238.
Balakrishnan, Shobana et al., "Providing Message Delivery Guarantees in Pipelined Flit-Buffered Multiprocessor Networks," Proceedings 1996 IEEE Real-Time Technology and Applications Symposium, 1996, USA, pp. 120-129.

* cited by examiner

*Primary Examiner*—Meng-Ai An
*Assistant Examiner*—Lechi Truong
(74) *Attorney, Agent, or Firm*—Lee & Hayes, PLLC

(57) ABSTRACT

In accordance with certain aspects of configurable message pipelines, a service allows one or more applications running on a system to communicate with one or more other systems. The service includes a port having a send pipeline to allow the one or more applications to send messages to the one or more other systems and/or a receive pipeline to allow the one or more applications to receive messages from the one or more other systems. Each of the send pipeline and the receive pipeline is configurable by the one or more applications to include functionality desired by the one or more applications.

14 Claims, 7 Drawing Sheets

CONFIGURABLE MESSAGE PIPELINES

TECHNICAL FIELD

This invention relates to messages and communication, and more particularly to configurable message pipelines.

BACKGROUND

Oftentimes programs running on a computing device desire to communicate with other programs running on that same computing device or on other computing devices. This communication can be carried out by the programs sending messages to one another, the messages carrying the data that the programs desire to communicate to one another. Different programs, or even different portions of the same program, may desire different features to be employed when communicating with another such program or portion. For example, some programs or portions thereof may desire that all messages be encrypted, thereby preventing a third party that may intercept the message from reading the message, while other programs or portions thereof may not be concerned with such privacy. By way of another example, some programs or portions thereof may desire that messages be reliably communicated to their destination (e.g., the messages must be received at their destination), whereas other programs or portions thereof may not be concerned with such reliable communication and may be willing to allow messages to be occasionally dropped.

One way in which programs or portions thereof can communicate with other programs is through a service that is running on the computing device(s) that is (are) running the programs. Such a service receives messages from a program or portion thereof and transmits the message to the desired destination program.

Current services that allow for such communication, however, typically provide a single set of features and make it very difficult, if even possible at all, for a program or portion thereof to change the features being used. For example, it is typically difficult for a program or portion thereof to change whether the service will use encryption with its messages, or to change the type of encryption that is used. In order to provide greater flexibility to and facilitate designing programs that use such messages, it would be beneficial to have a way in which changes to these features used for such communication could be changed.

SUMMARY

Configurable message pipelines are described herein.

In accordance with certain aspects, a plurality of message handlers that are to be included in a pipeline of a service used to communicate with one or more other services are identified. Each of the plurality of message handlers is designed to operate on a message passed into the pipeline. A request that the pipeline be made available for use is made, with messages passed into the pipeline being operated on based on the identified plurality of message handlers.

In accordance with certain other aspects, a service allows one or more applications running on a system to communicate with one or more other systems. The service includes a port having a send pipeline to allow the one or more applications to send messages to the one or more other systems and/or a receive pipeline to allow the one or more applications to receive messages from the one or more other systems. Each of the send pipeline and the receive pipeline is configurable by the one or more applications to include functionality desired by the one or more applications.

BRIEF DESCRIPTION OF THE DRAWINGS

The same numbers are used throughout the document to reference like components and/or features.

DETAILED DESCRIPTION

Figure 1:
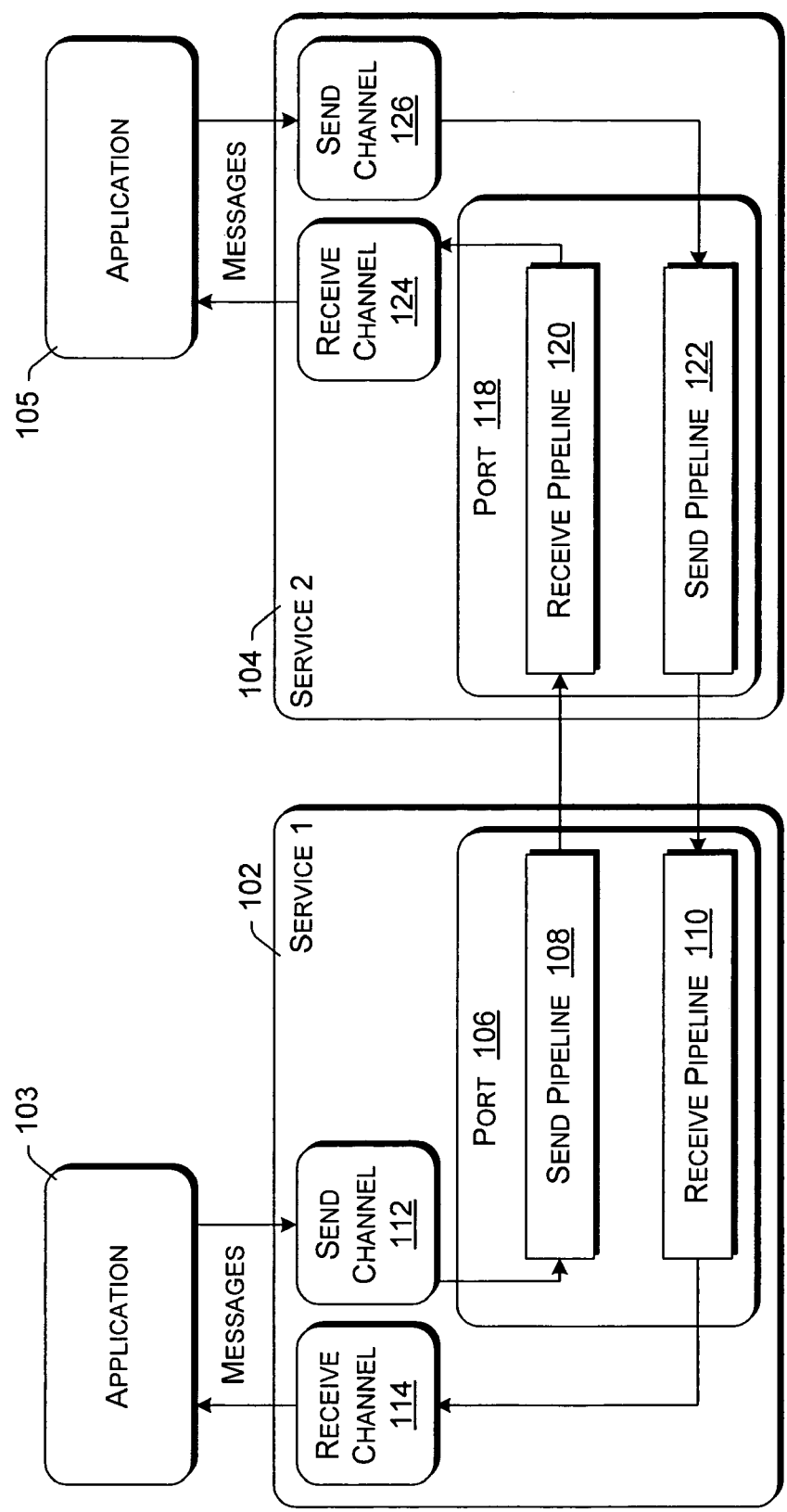
FIG. 1 illustrates an example environment employing configurable message pipelines.

FIG. 1 illustrates an example environment employing the configurable message pipelines described herein. In FIG. 1, two services 102 and 104 are shown that allow messages to be communicated between two applications or programs 103 and 105. Each service 102 and 104 can be, for example, an application or a process of an application running on a computing device. It should be noted that, although communication between two applications and two services is illustrated in the example of FIG. 1, additional applications may communicate with one another using the services 102 and 104, and/or additional services may communicate with services 102 and/or 104.

Application 103 and service 102 can be running on the same computing device as application 105 and service 104, or alternatively may be running on two different computing devices. In situations where services 102 and 104 are on two different computing devices, the services 102 and 104 may communicate with one another over any of a variety of transport media, including both wired and wireless media.

A message to be communicated between services 102 and 104 typically includes a message body and one or more message headers. The message body usually includes the data or information that is to be communicated from one service to the other, although in some situations that data or information may be included in a message header(s), allowing the message body to be left empty or alternatively not included. The message headers include various information about the message and/or how the message is to be communicated, such as an identifier of the service to which the message is to be sent and/or an identifier of the service from which the message is received.

Messages can take any of a variety of forms. In certain embodiments, messages are in accordance with the Simple Object Access Protocol (SOAP). In other embodiments, messages can be in accordance with other public or proprietary message protocols. For example, messages can be Windows® operating system messages, such as those used in the Windows® operating systems available from Microsoft Corporation of Redmond, Washington.

Service 102 includes one or more ports 106, each port 106 having a send pipeline 108 and a receive pipeline 110. The send pipeline 108 and receive pipeline 110 both have various features or functionality that are applied to messages that pass through the pipeline. These different features or functionality are applied by different transforms or handlers in the pipeline, as discussed in more detail below. Examples of such features or functionality include encryption/decryption, performance counters, reliable messaging, and so forth. The particular functionality included in the pipelines 108 and 110 is configurable by application 103.

Both a send pipeline 108 and a receive pipeline 110 are included in port 106 to support bi-directional communication with service 104. However, if uni-directional communication is desired, then only one of the pipelines 108 or 110 need be included (e.g., send pipeline 108 would be included in port 106 if no messages were to be received from another service by port 106, and receive pipeline 110 would be included in port 106 if no messages were to be sent to another service by port 106).

Port 106 can also have one or more channels. A channel describes a particular destination service and/or source service for messages. The destination and/or source can be identified in different ways, such as by IP (Internet Protocol) address, URL (Uniform Resource Locator), and so forth. A channel also describes a type of communication to be used in sending and/or receiving messages. Examples of such types of communication include: a datagram type, where messages are sent by a service and no response or acknowledgment of their receipt need be returned; a request/reply type, where a message is sent and the sender waits for a reply, then correlates the reply with the message; a dialog type, where all messages in an exchange are correlated with one another, but not necessarily in a one-to-one relationship; and a publisher/subscriber type, where a sender can publish messages on a channel and everyone that has subscribed to that channel receives them.

A send channel 112 and a receive channel 114 are also illustrated as part of service 102. Although only one send channel 112 is illustrated in service 102, service 102 may include two or more send channels. Typically, only a single receive channel is included in service 102, although alternatively two or more receive channels could be included in service 102. Each channel on port 106 shares the same send pipeline 108 and receive pipeline 110. Thus, send channel 112 can also be viewed as including send pipeline 108, and receive channel 114 can also be viewed as including receive pipeline 110.

So, when application 103 desires to send a message to application 105, the message is placed in a channel of port 106 (e.g., send channel 112), the channel adds the appropriate destination and communication type information for that channel to the message (e.g., as one or more headers), and then the channel passes the message to the send pipeline 108. The various features and/or functionality of the send pipeline 108 are applied, and the message is communicated to its intended destination.

Analogous to service 102, service 104 includes a port 118, a receive pipeline 120, a send pipeline 122, a receive channel 124, and a send channel 126. Port 118, receive pipeline 120, send pipeline 122, receive channel 124, and send channel 126 are analogous to port 106, receive pipeline 110, send pipeline 108, receive channel 114, and send channel 112 discussed above. Receive pipeline 120 and send pipeline 122 are configurable by application 105. For messages sent by application 103 where application 105 is the intended destination, the messages pass through send pipeline 108 and then through receive pipeline 120. Similarly, for messages sent by application 105 where application 103 is the intended destination, the messages pass through send pipeline 122 and then through receive pipeline 110.

Each pipeline is made up of a set of one or more message handlers, each message handler being an object, component, or other module that is responsible for carrying out particular functionality for or implementing a particular feature of the pipeline. The message is passed from message handler to message handler in the pipeline, with each message handler operating on and/or transforming the message as desired. As discussed in more detail below, different pipelines can be created that include different message handlers, thereby allowing the pipelines to be configured (e.g., customized or personalized) to include the particular functionality desired by the applications. Additionally, new message handlers can be written and added to a pipeline, thereby allowing the pipelines to be further configurable by allowing new functionality to be added to a pipeline and/or functionality to be changed (e.g., a security handler could be replaced with a new security handler to support a different type of encryption).

The design of the pipelines and the message allows each message handler to act on the message it its entirety, or wrap the message and pass it on to the next message handler so that the processing of the message is demand driven. Message handlers can operate on the message using different approaches, such as a buffered approach or a streaming approach. Using a buffered approach, the message handler operates on the message body in its entirety. However, using a streaming approach, the message handler operates on different pieces of the message body individually as it desires (the processing of the message is demand driven). Different message handlers within the same pipeline can operate on the message using these different approaches. For example, one or more message handlers within a pipeline can process messages using a buffered approach, while one or more other message handlers within the same pipeline can process messages using a streaming approach.

Figure 2:
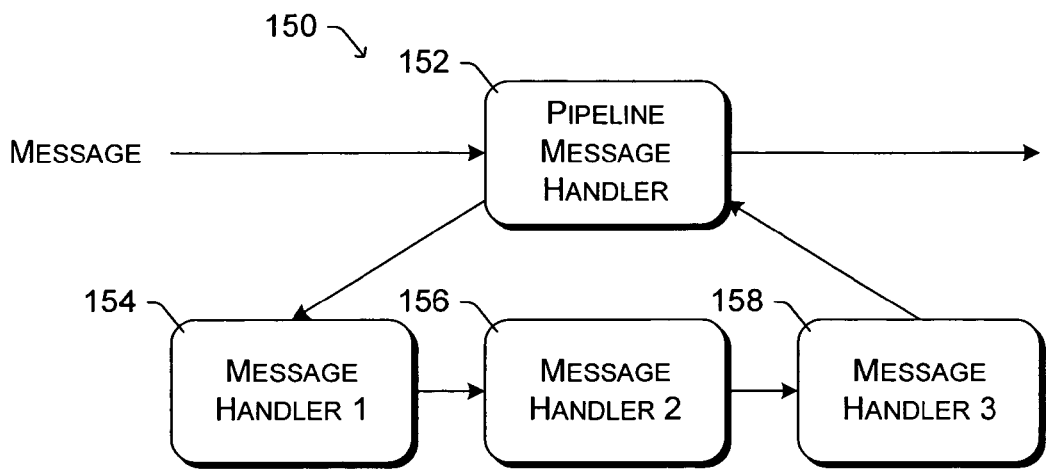
FIG. 2 illustrates an example pipeline.

FIG. 2 illustrates an example pipeline 150, which can be any of the pipelines 108, 110, 120, or 122 of FIG. 1. The pipeline 150 is made up of multiple message handlers. In the example of FIG. 2, pipeline 150 is made up of four message handlers 152, 154, 156, and 158.

One of the message handlers in pipeline 150 is a top-level message handler 152 that is referred to as the pipeline message handler (or simply as the pipeline). A pipeline message handler represents a pipeline of one or more other message handlers. In the case of pipeline message handler 152, pipeline message handler 152 represents message handlers 154, 156, and 158. Pipeline message handler 152 receives a message and passes it to the next message handler 154 in pipeline 150.

In certain embodiments, the functionality provided by pipeline message handler 152 is to coordinate the path of the message through the pipeline. In these embodiments, the message handlers 154, 156, and 158 are to be applied in a certain order (for example, in a receive pipeline a message handler imposing expiration dates on a message should be invoked after a message handler that decrypts the message is invoked), and this order is known by pipeline message handler 152. Pipeline message handler 152 invokes the message handlers 154, 156, and 158 in accordance with this order, and each of the message handlers 154, 156, and 158 returns the message when it is finished operating on the message (or alternatively a value indicating that it is finished operating on the message).

In other embodiments, no such centralized control need be provided by pipeline message handler 152. In these embodiments, each of the message handlers 154, 156, and 158 knows (e.g., is programmed with) at least the identity of the next message handler in the pipeline, and optionally also with the identity of the previous message handler in the pipeline. Thus, message handler 154 knows that when it is finished operating on the message, it is to pass the message (or alternatively a value indicating that it is finished operating on the message) to message handler 156.

In some instances, a message may be targeted for a particular one of the message handlers 152, 154, 156, or 158, and thus is consumed by that message handler. A message handler that consumes a message uses the information in the message as it desires, and does not free up the message for use by other message handlers. For example, a message may include control information that is destined for one of the message handlers, such as a certificate or key destined for a message handler that provides security functionality—the security message handler would keep the message, use the certificate or key as it needs to, and not pass the message on to any other message handlers in the pipeline.

When invoked, each message handler 152, 154, 156, and 158 operates on the message in some manner, and then returns a value indicating whether it has consumed the message. For example, a value of True may be returned to indicate that the message handler has finished operating on the message and that the next message handler can operate on the message as it desires, while a value of False may be returned to indicate that the message handler has consumed the message.

The manner in which a particular message handler operates on the message can vary based on the particular message handler. This operation may involve transforming the message in some way, or simply checking different aspects of the message. For example, a performance counter message handler may check the size of a message (e.g., in bytes), but not transform the message. By way of another example, a security message handler may encrypt (or decrypt) a message, thereby transforming the message from plain text to cipher text (or from cipher text to plain text).

The last message handler in a send pipeline, as well as the first message handler in a receive pipeline, is typically a transmission handler. The transmission handler is responsible for writing the message out to the transport medium (in the case of a send pipeline) and for receiving the message from the transport medium (in the case of a receive pipeline).

By having a top-level pipeline message handler 152, the pipeline 150 itself can be viewed as a message handler. That is, pipeline message handler 152 can be the pipeline, and it invokes one or more other message handlers that, together, carry out the desired operations on messages.

A pipeline can also be viewed as having multiple stages, with different functionality or features being provided at each stage. Each stage corresponds to a different message handler, and the functionality provided in that stage is the functionality provided by the message handler corresponding to that stage. As the pipelines are configurable, different stages can be included in different pipelines.

Each message handler within the pipeline can itself represent one or more other message handlers, and a message handler that represents one or more other message handlers is also referred to as a pipeline message handler. This representation is also referred to as aliasing. When a message handler represents one or more other message handlers, the functionality provided by that message handler includes coordinating the path of the message through those other message handlers. Such a message handler may also optionally perform other operations on the message. Thus, the message handlers may be nested to any number of levels by having message handlers represent one or more other message handlers.

It should be noted that, although messages are illustrated as entering and leaving the pipeline at pipeline message handler 152 of FIG. 2 (and pipeline message handler 180 of FIG. 3 discussed below), messages may alternatively enter or leave the pipeline at one of the other message handlers. For example, message handler 158 may write the message out to a transport medium or pass the message to a receive channel, and thus the message can be viewed as leaving the pipeline at message handler 158. By way of another example, message handler 154 may receive the message from a send channel or a transport medium, and thus the message can be viewed as entering the pipeline at message handler 154.

Figure 3:
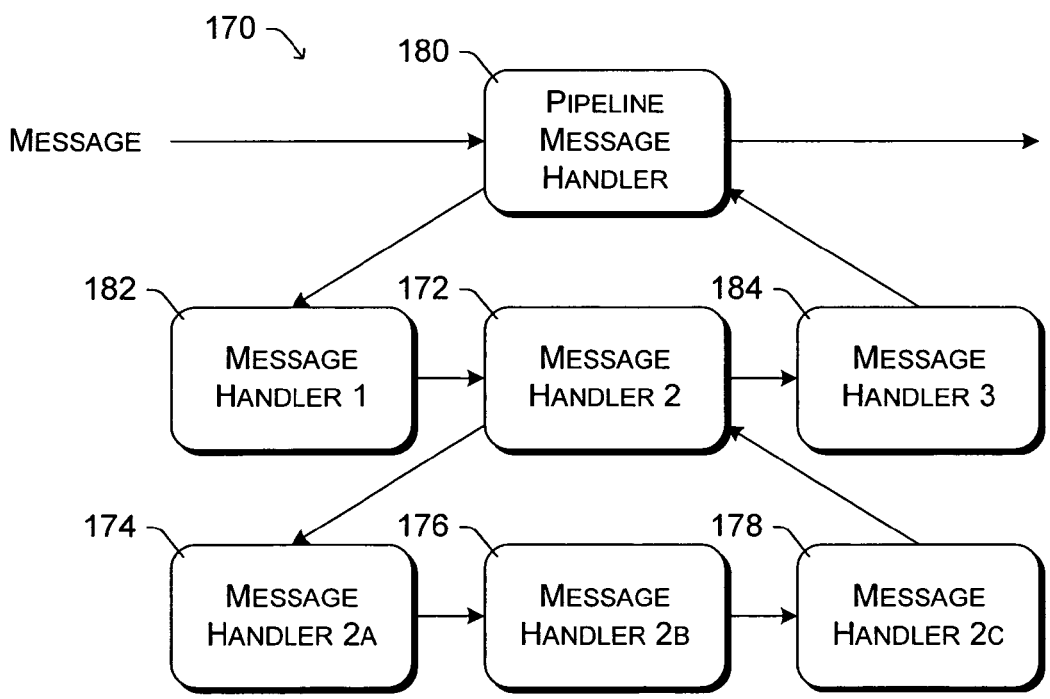
FIG. 3 illustrates an example of nesting message handlers in a pipeline.

FIG. 3 illustrates an example of nesting message handlers in a pipeline 170. In pipeline 170, message handler 172 represents three other message handlers: message handler 174, message handler 176, and message handler 178. Message handler 172 can also be referred to as a pipeline message handler because it represents a pipeline of other message handlers. Thus, when a message is received at pipeline message handler 180, the message is handled by the message handlers 172-184 in the following order: message handler 182, message handler 174, message handler 176, message handler 178, and message handler 184.

Figure 4:
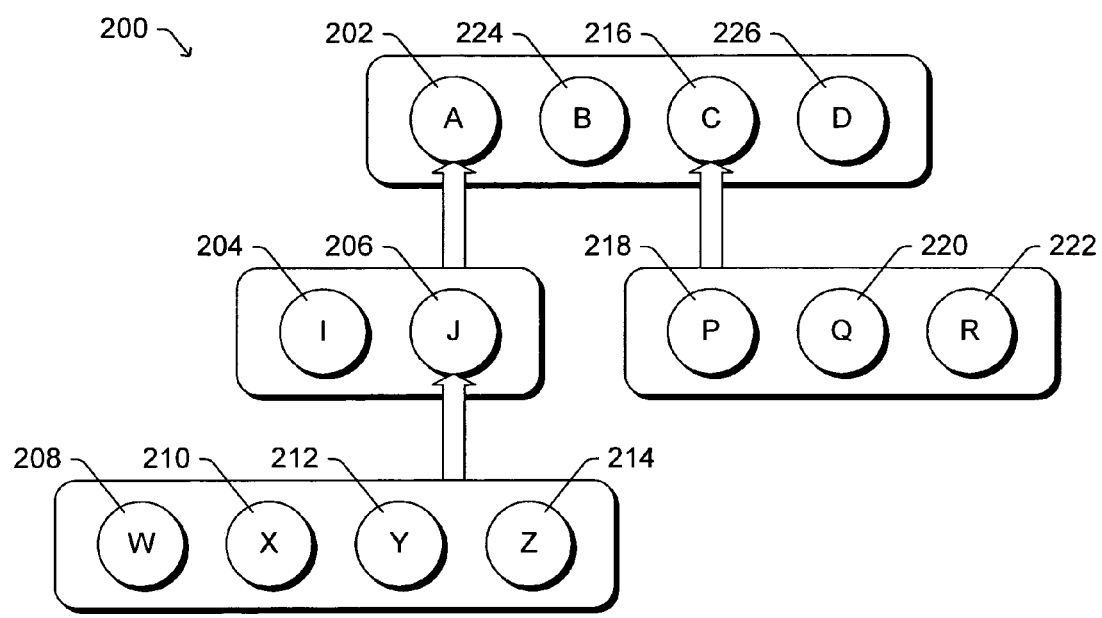
FIG. 4 illustrates another example of nesting message handlers in a pipeline.

FIG. 4 illustrates another example of nesting message handlers in a pipeline 200. In pipeline 200, message handler 202 represents a set of two additional message handlers 204 and 206. Message handler 206, in turn, represents a set of four message handlers 208, 210, 212, and 214. Additionally, message handler 216 represents three message handlers 218, 220, and 222. So, when a message passes through pipeline 200, it will pass through the message handlers 202-226 in the following order: message handler 204, message handler 208, message handler 210, message handler 212, message handler 214, message handler 224, message handler 218, message handler 220, message handler 222, and message handler 226.

It should be noted that, when a pipeline is processing a message, a particular message handler may raise an exception. In the event that such an exception is raised, the message handler that raises the exception passes the exception to the caller of the message handler. The caller in turn passes the exception to its caller. This passing continues until the exception is raised or "bubbles up" to a handler that understands how to handle the exception. In certain embodiments, the exception bubbles up to the send pipeline or receive pipeline (e.g., pipeline message handler 152 of FIG. 2), and that pipeline includes instructions that can handle the exception (e.g., by returning a fault or message error to the source of the message).

It should also be noted that the various message handlers in the pipeline (other than the pipeline message handler(s)) need not be aware of the architecture of the pipeline. That is, except for the pipeline message handler(s), the message handlers need not be aware of any other message handlers are in the pipeline, or of the order in which the message handlers exist in the pipeline. Rather, each message handler only needs to know what to do when it is finished operating on the message. For example, the message handler may simply return a value indicating that it is done operating on the message, return a value indicating that the caller should stop processing the message, or alternatively may forward the message to a next message handler in the pipeline. As this structure does not require the message handlers to have knowledge of what operations are performed in the pipeline (e.g., a security message handler need only be concerned with the encryption, decryption, certification, etc. of the message without regard for what other message handlers are operating on the message in the pipeline), this structure allows the message handlers to be easily changed or new message handlers to be added. In the case of the pipeline message handler(s), the pipeline message handler(s) typically need only know the architecture of the message handler(s) they represent (e.g., in what order the message handlers they represent should be invoked).

Table I illustrates examples of message handlers that may be included in a pipeline. In certain embodiments, the message handlers of Table I are made available to applications by the services (e.g., service 102 and 104 of FIG. 1). However, pipelines need not include all of these message handlers. Rather, the applications can identify to the services particular ones of the message handlers that they desire to have included in the pipelines. Thus, the applications can configure the pipelines to include only those message handlers that the applications desire to be included.

TABLE I

| Message Handler | Description |
| --- | --- |
| Application (or Handler) | This is typically the last message handler in a receive pipeline - all infrastructure messages have typically been consumed by another message handler by the time the message is received at the Application handler, so these messages are intended for the application or service using the port. The application or service can hook into this handler and see all messages that are seen by the Application handler. |
| Datagram (or DatagramBinder) | Used to carry out datagram type communications between services. |
| Did Understand | Some messages can include headers with a "Must Understand" attribute that indicates that the header must be understood by the receive pipeline. If the header is not understood, then the message should not be forwarded to the targeted application or service. As message handlers operate on the message, the handlers will oftentimes look at the headers and consume the headers. When a message handler consumes a header, the message handler marks the Must Understand attribute of the header as true (or otherwise marks the header as having been understood). When the message reaches the Did Understand message handler, the Did Understand message handler checks whether all of the Must Understand attributes in the message headers have been marked as true. If all of the Must Understand attributes in the message headers have been marked as true, then the message can be allowed to be forwarded to the targeted application or service. However, if one or more of the Must Understand attributes in the message headers have not been marked as true, then the message is consumed by the Did Understand message handler and is not allowed to be forwarded to the targeted application or service. there's an attribute on SOAP headers of Must Understand, and it can be true or false (if true, it means in order to process this message, you must understand this header, and if you do not understand this header do not process any of this message). |
| Performance Counters (or PerfCounters) | This handler looks at the message and determines the size of the message (e.g., in bytes), then adds the size to performance counters for the port. This allows the amount of data being handled by the port to be tracked. |
| Policy | The policy of a pipeline refers to the various features or functionality that are supported by the pipeline and/or required by the pipeline. For example, the policy may indicate that the pipeline requires that messages have a particular type of security, or that the pipeline simply supports (but does not require) that messages have a particular type of security. Messages from other services requesting information about this pipeline's policy may be received and consumed by this handler. In response to such requests, the handler returns a policy document that describes the pipeline's policy. This handler may optionally do checking to verify that messages conform to its policy, and consume those messages that do not (returning an indication to the source of the message that the message did not conform to the policy). |
| Receive Reply | Used to carry out request/reply type communications between services. |
| Reliable Messaging | Used to carry out reliable messaging type communications between services. Reliable messaging type communications ensure that a message is received at its destination, allowing for the message to be re-sent in case it is not received. |
| Role Set | Used to perform role checking (e.g., in accordance with the SOAP message protocol). Adds (in the case of a send pipeline) or verifies (in the case of a receive pipeline) the SOAP Role Set played by the port that includes the pipeline. |
| Route | Used in services that are routers. This handler matches messages against routes in the router. |

TABLE I-continued

| Message Handler | Description |
| --- | --- |
| Rule Administration | Used in services that are routers. This handler processes SOAP router Rule Administration messages received at the pipeline. |
| Secure Reply | Used to perform security checking for reply messages. Processes and verifies the security information in a reply message for request/reply types of communication. |
| Secure Request | Used to add security information to a request message for request/reply types of communication. |
| Security | Performs security for messages, such as digitally signing messages, encrypting messages, verifying authentication tokens, placing authentication tokens on the message, and so forth. |
| Spy | This handler allows messages to be seen before other message handlers in the pipeline processes the message. Used, for example, for logging, debugging, or tracing purposes. |
| Spy Post Security | This handler allows messages to be seen after they have been processed by the security message handler, but before other message handlers in the pipeline process the message. Similar to the spy message handler, but allows the message to be seen after being decrypted by the security message handler. |
| Transmission (or Transmit) | Used to write messages out to the transport medium (in the case of a send pipeline) and to receive messages from the transport medium (in the case of a receive pipeline). |

In certain embodiments, the send and receive pipelines have a particular default ordering for the message handlers that they include. This default ordering allows various dependencies among the various message handlers to be accommodated. For example, the security message handler typically must be earlier in the pipeline than many of the other message handlers so that the message can be decrypted before the other message handlers operate on it. In certain implementations, the default ordering from first to last for message handlers in the send pipeline is as follows: Spy, Policy, Security,. Secure Request, Transmission. Additionally, in certain implementations the default ordering from first to last for message handlers in the receive pipeline is as follows: Spy, Performance Counters, Role Set, Secure Reply, Security, Policy, Spy Post Security, Rule Administration, Route, Did Understand, Reliable Messaging, Receive Reply, Datagram, Application.

In addition to these message handlers, an application can easily add additional message handlers to the pipeline and/or replace message handlers with other message handlers. These replacements and/or additions are also referred to as extensions to the pipeline, and the message handlers that are included as such replacements and/or additions are also referred to as extension message handlers (or simply extension handlers). For example, assume that an application desires to have a security message handler included in the pipeline, and further assume that the security message handler in the service supports one type of encryption (e.g., encryption based on 64-bit keys). Further assume that an application designer desires to have the pipelines use a security message handler that supports a different type of encryption (e.g., encryption based on 128-bit keys). The application designer can easily make this change by designing (or purchasing or otherwise acquiring) a message handler that supports the desired type of encryption (e.g., encryption based on 128-bit keys). This new message handler can then be used to replace the security message handler that was included with the application. This replacement can be achieved, for example, by informing the port of the identity of the new security message handler that is to be used when it creates a pipeline rather than using the security message handler that was included with the service.

Figure 5A:
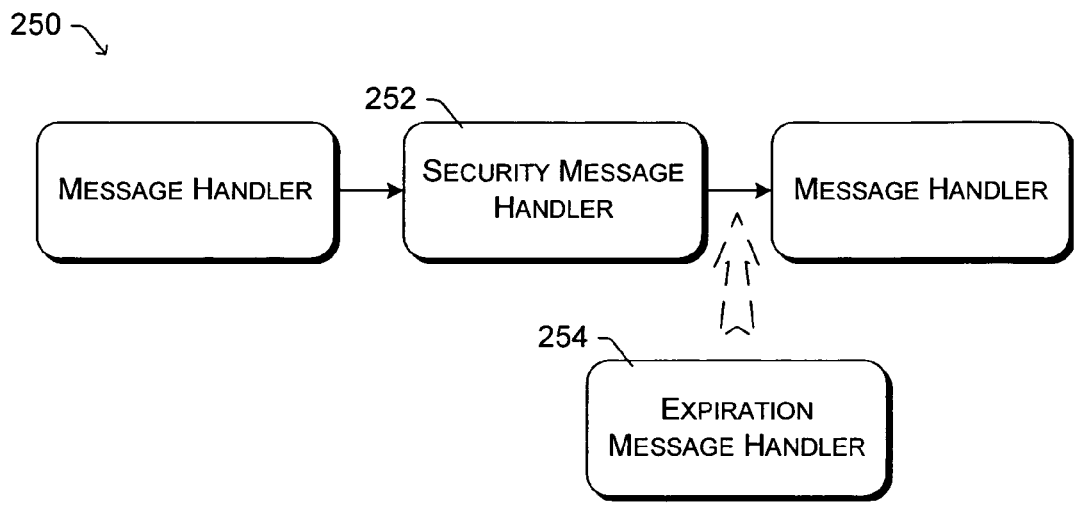
FIGS. 5*a* and 5*b* illustrate a portion of a pipeline and an example of a message handler representing other message handlers.
Figure 5B:
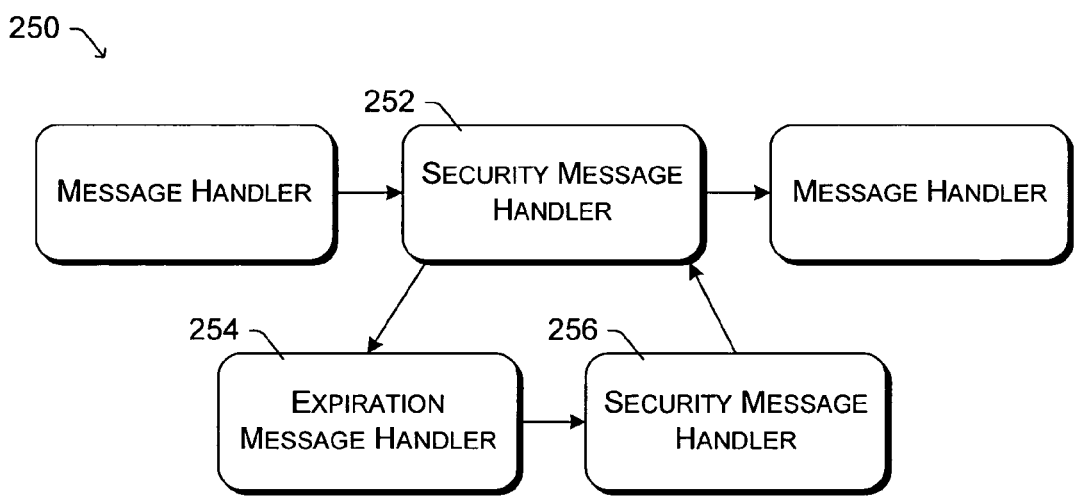

By way of another example, assume that the application designer desires to have expiration functionality included in the pipeline. Such expiration functionality could, for example, have messages expire a certain period of time after the message has been sent, and would prevent any messages from being passed to the application if they have expired. Such functionality can be easily added to the application by the application designer designing (or purchasing or otherwise acquiring) a message handler that implements this expiration functionality. This new message handler can then be inserted into the pipeline at the desired location. This insertion can be achieved, for example, by informing the port of the desired new message handler and where it should be in the pipeline. The current message handler at that location can then be replaced to represent two other message handlers—the message handler being replaced as well as the new message handler. This point can be seen by referring to FIGS. 5a and 5b. FIGS. 5a and 5b illustrate a portion 250 of a pipeline that includes a security message handler 252. Assume that the expiration message handler 254 is to be located in the pipeline immediately after the security message handler 252 of FIG. 5a. As shown in FIG. 5b, the message handler 252 is changed to represent or alias two message handlers: expiration message handler 254 and security message handler 256. Message handler 252 thus no longer provides the security functionality, rather security message handler 256 provides the security functionality. Security message handler 256 performs the same functionality as security message handler 252 of FIG. 5a (it may, however, have a different name).

In certain embodiments, the application designer has control to include or not include, each of the message handlers available by the service (e.g., the handlers listed in Table I), as well as include extension message handlers. In other embodiments, the functionality of one or more message handlers may be included in the channel that the application passes messages to (and/or receives messages from), thereby reducing the control the application designer has to include or not include particular functionality in pipelines. Multiple such channels may be supported by a service to make various combinations of functionality available to the application designer.

By way of example, rather than having a datagram message handler to allow datagram type communications, the datagram type communication functionality may be embedded in the channel. Thus, if the application designer desired to send messages using the datagram type communications, the application designer could open a datagram channel, with the channel itself providing the datagram type communication functionality rather than the pipeline.

By way of another example, rather than having a security message handler for encryption or decryption, the security functionality may be embedded in the channel. Thus, if the application designer desired to send encrypted messages, the designer could open a security channel, with the channel itself providing the encryption functionality rather than the pipeline.

Figure 6:
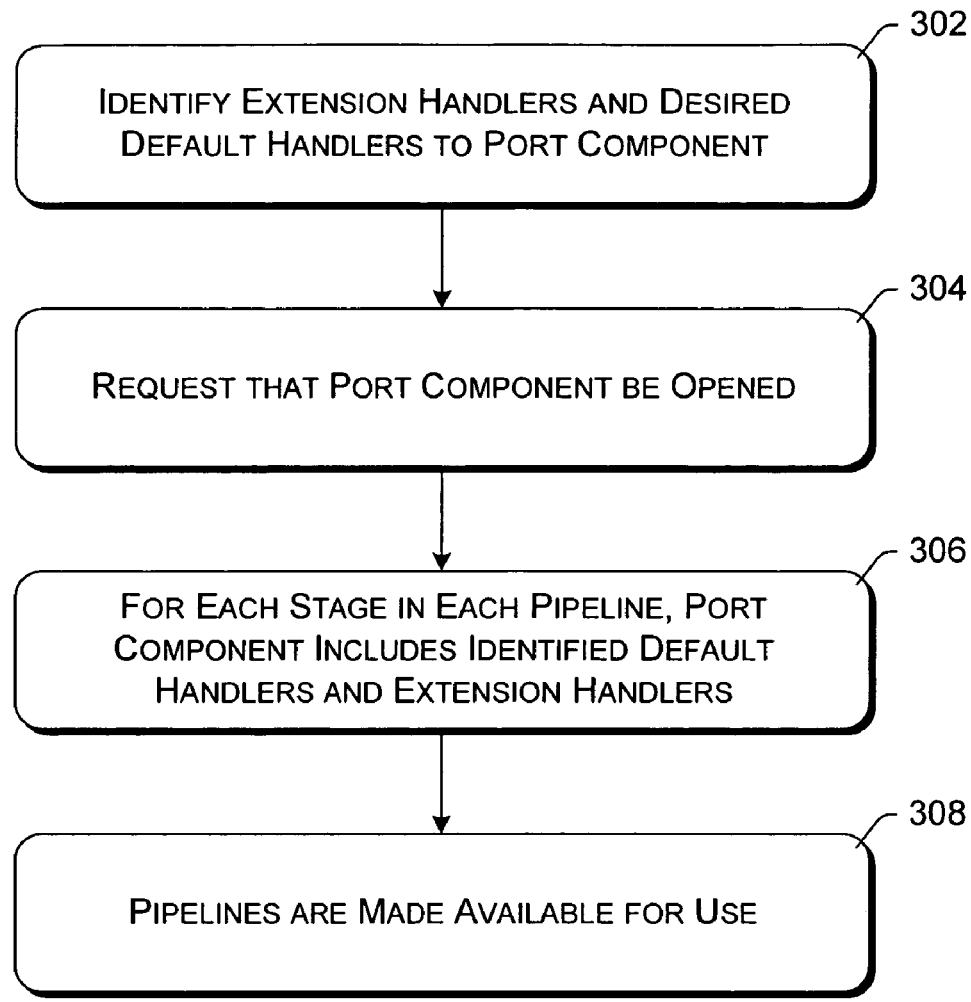
FIG. 6 is a flowchart illustrating an example process of creating a pipeline.

FIG. 6 is a flowchart illustrating an example process 300 of creating a pipeline. Process 300 can be carried out in software, firmware, hardware, or combinations thereof. Process 300 applies to send pipelines as well as receive pipelines.

Initially, the application identifies the extension handlers and desired default handlers to the port component (act 302). The port component can be, for example, port 106 and port 118 of FIG. 1. The desired default handlers refer to those message handlers that are included in the service (e.g., those listed in Table I above) that the user desires to have included in the pipeline. As discussed above, not all of the message handlers that can be used need be used in a pipeline. The extension handlers refer to those additional message handlers that the end user desires to be included in the pipeline, such as those message handlers that replace one of the default message handlers or are in addition to the default message handlers.

After the handlers are identified, the application requests that the pipeline be made available for use by submitting a request to open the port component (act 304). In response to the request, the port component includes, for each stage in both the send pipeline and the receive pipeline, the default and extension handlers identified in act 302 (act 306). This creates the pipeline including the message handlers desired by the application designer. In act 306, the port component may also configure a pipeline message handler to invoke the various identified message handlers in the proper order for the pipeline.

Once all of the identified handlers have been included in the pipelines, the send and receive pipelines are made available for use (act 308). At this point, channels can be created and messages can be sent using the port.

Figure 7:
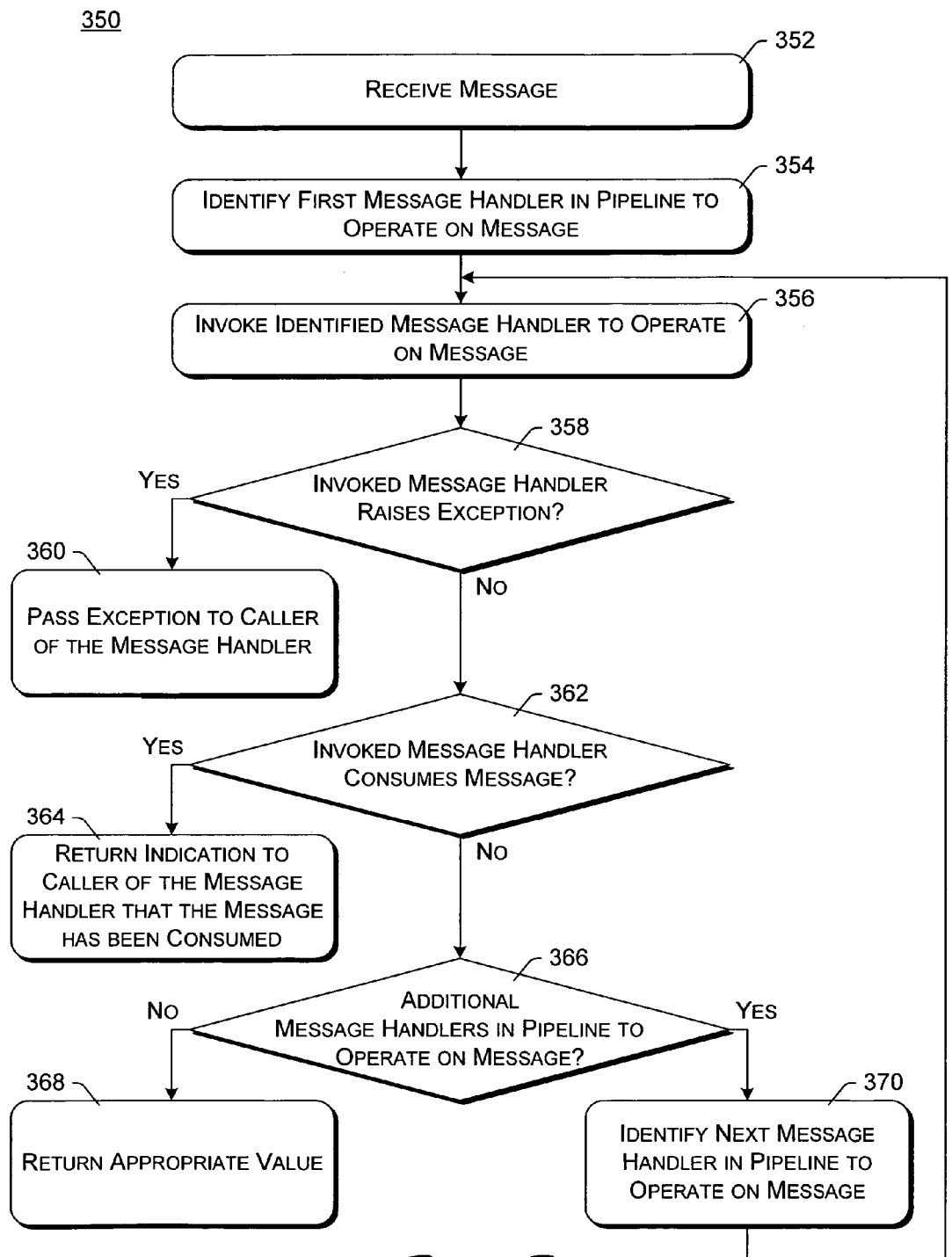
FIG. 7 is a flowchart illustrating an example process of operation of a pipeline.

FIG. 7 is a flowchart illustrating an example process 350 of operation of a pipeline. Process 350 can be carried out in software, firmware, hardware, or combinations thereof. Process 350 applies to send pipelines as well as receive pipelines.

Initially, a message is received by the pipeline (act 352). In the case of a receive pipeline, the message is received from the transport medium, and in the case of a send pipeline, the message is received from an application by way of a channel (e.g., a channel object). The first message handler in the pipeline to operate on the message is identified (act 354), and the identified message handler is invoked to operate on the message (act 356). In the receive pipeline, acts 354 and 356 may be inherent in the receipt of the message from the wire. For example, the message may be received by the first message handler in the receive pipeline.

Process 350 continues based on whether the invoked message handler raises an exception (act 358). If the invoked message handler raises an exception, then the exception is passed to whatever component (e.g., another message handler, the pipeline, etc.) called or invoked the message handler (act 360). As discussed above, exceptions can bubble or rise until they reach a component that can handle them. The process 350 then ends for that message.

If the invoked message handler does not raise an exception, then process 350 continues based on whether the invoked message handler consumes the message (act 362). If the invoked message handler consumes the message, then an indication is returned to the caller of the message handler that the message has been consumed (act 364). As such, the message is not to be operated on by any remaining message handlers in the pipeline, and the process 350 ends for that message.

If the invoked message handler does not consume the message, then process 350 continues based on whether there are additional message handlers in the pipeline that are to operate on the message (act 366). If there are no additional message handlers in the pipeline to operate on the message, then an appropriate value is returned (act 368) indicating that the pipeline has finished operating on the message and the message can be forwarded to the destination (e.g., application or transport medium). However, if there are additional message handlers in the pipeline to operate on the message, then the next message handler in the pipeline to operate on the message is identified (act 370). Process 350 then returns to act 356, where the message handler identified in act 370 is invoked to operate on the message.

It should be noted that in certain embodiments the last message handler in the pipeline consumes the message, so act 368 is not used. For example, the last message handler in the send pipeline may be a transmission handler that consumes the message by transmitting the message on the transport medium. By way of another example, the last message handler in the receive pipeline may be an application handler that consumes the message by forwarding the message to the destination application.

EXAMPLE IMPLEMENTATION

In certain embodiments, the ports, pipelines, and message handlers are implemented as programming objects in a computing device. These objects have various properties, methods, constructors, and/or events. An example implementation using such objects follows.

Message Processing Objects
IMessageHandler Interface
public interface IMessageHandler The IMessageHandler interface provides the base interface for message processing. A MessageHandler encapsulates the notion of a message consumer through a simple interface designed around synchronous and asynchronous versions of a single method: ProcessMessage. It is the fundamental interface for processing messages. Other classes combine instances of this interface together to provide composite functionality. For example, the pipeline implements IMessageHandler in terms of a series of IMessageHandlers. Ports use IMessageHandler for processing received messages.

A message can be processed synchronously or asynchronously; it is up to the caller to determine how it will call it. The CompletesSynchronously flag is a hint the caller can use to call the synchronous version and avoid the overhead often associated with asynchronous operations.

The bool (Boolean) return result indicates the processing flow of the message. If ProcessMessage returns true, it is returning ownership of the message to the caller. If it returns false, it is taking ownership and the obligation to ensure the message is ultimately closed. When it returns false, the caller is obligated not to look at or touch the message any more.

Properties bool CompletesSynchronously {get;}
    Gets whether the implementation of ProcessMessage is inherently synchronous.
Property Value:
    true if the implementation of ProcessMessage is inherently synchronous; false otherwise.
Remarks:
    A common design pattern is for one IMessageHandler H to call others to process a Message. Typically the nested IMessageHandlers are called the same way H was called. That is, if H was called with ProcessMessage (synchronous) the nested IMessageHandlers are too. If H was called with Begin / EndProcessMessage (asynchronous), so are the nested IMessageHandlers.
    However, this need not be the case. For instance, if H is called asynchronously, but a nested IMessageHandler is really synchronous, then it would be nice to avoid the overhead of creating objects to manage the asynchronous call (e.g., IAsyncResult) and just call the nested IMessageHandler synchronously. A caller can determine whether the nested IMessageHandler is synchronous or not by checking the CompletesSynchronous property.

Methods

IAsyncResult BeginProcessMessage(Message message, AsyncCallback callback, object state);
    Asynchronous begin for ProcessMessage.
Parameters:
    message: System.MessageBus.Message
        The Message to process.
    callback: System.AsyncCallback
        See Asynchronous Design Pattern. The Asynchronous Design Pattern is the pattern by which work is initiated and a callback registered so that the callback is invoked when the work is complete. This allows the caller to continue to perform other operations while the called function waits for data to be received on the wire, for example. The Asynchronous Design Pattern is part of the Microsoft ® .NET ™ Framework, and additional information regarding the Asynchronous Design Pattern is available from Microsoft Corporation of Redmond, Washington.
    state: System.Object
        See Asynchronous Design Pattern.
Return Value:
    See Asynchronous Design Pattern.
bool EndProcessMessage(IAsyncResult result);
    Asynchronous end for ProcessMessage.
Parameters:
    result: System.IAsyncResult
        See Asynchronous Design Pattern.
Return Value:
    true if the IMessageHandler has not and will not call Close ; otherwise, false.
bool ProcessMessage(Message message);
    Processes a Message.
Parameters:
    message: System.MessageBus.Message
        The Message to process.
Return Value:
    true if the IMessageHandler has not and will not call Close; otherwise, false.
Remarks:
    A call to ProcessMessage processes a Message and returns a bool.
    Returning true from ProcessMessage implies the IMessageHandler has not and will not call Close. (Someone else should.) The caller is permitted to continue reading and/or processing the Message.
    Returning false from ProcessMessage implies the IMessageHandler has or will call Close. The caller should not continue reading and/or processing the Message.

AsyncMessageHandler Class public abstract class AsyncMessageHandler: IMessageHandler Base class for an asynchronous IMessageHandler. This class provides a base implementation for ProcessMessage (synchronous) in terms of the Begin/EndProcessMessage (asynchronous) calling pattern. This allows a class that derives from AsynchronousMessageHandler (and implements Begin/EndProcessMessage) to expose the synchronous call pattern without having to explicitly implement it.

Constructors protected AsyncMessageHandler( );

Properties public virtual bool CompletesSynchronously {get;}
    Gets whether the implementation of ProcessMessage is inherently synchronous.
Property Value:
    False
Remarks:
    See IMessageHandler for details.

Methods public abstract IAsyncResult BeginProcessMessage(Message message, AsyncCallback callback, object state);
    Asynchronous begin for ProcessMessage.
Parameters:
    message: System.MessageBus.Message
        The Message to process.
    callback: System.AsyncCallback
        See Asynchronous Design Pattern.
    state: System.Object
        See Asynchronous Design Pattern.
Return Value:
    See Asynchronous Design Pattern.
public abstract bool EndProcessMessage(IAsyncResult result);
    Asynchronous end for ProcessMessage.
Parameters:
    result: System.IAsyncResult
        See Asynchronous Design Pattern.
Return Value:
    true if the IMessageHandler has not and will not call Close ; otherwise, false.
Remarks:
    See IMessageHandler for details.
public virtual bool ProcessMessage(Message message);
    Processes a Message.
Parameters:
    message: System.MessageBus.Message
        The Message to process.
Return Value:
    true if the IMessageHandler has not and will not call Close ; otherwise, false.
Remarks:
    See IMessageHandler for details.

SyncMessageHandler Class public abstract class SyncMessageHandler: IMessageHandler Base class for a synchronous IMessageHandler s. This class provides a base implementation for Begin/EndProcessMessage (asynchronous) in terms of the ProcessMessage (synchronous) calling pattern. This allows a class that derives from SyncMessageHandler (and implements ProcessMessage) to expose the asynchronous call pattern without having to explicitly implement it.

Rather than using the default constructor, you should indicate whether your ProcessMessage implementation can block by using a constructor with the canBlock parameter.

Constructors protected SyncMessageHandler( );
    Initializes a new instance of the SyncMessageHandler class.
Remarks:
    By default, CompletesSynchronously is true (CanBlock is false). It is very unlikely that you want this option. You should consider calling SyncMessageHandler(true) instead.
protected SyncMessageHandler(bool canBlock);

-continued

Initializes a new instance of the SyncMessageHandler class.
Parameters:
    canBlock: System.Boolean
        canBlock indicates whether or not the implementation of
        ProcessMessage can block the thread. [Begin/End]ProcessMessage
        uses this flag to decide whether to execute on the same or different
        thread. In general, canBlock = false will have better performance
        but a higher possibility of deadlocks (if ProcessMessage blocks),
        while canBlock = true will have chance a lower chance of deadlock,
        but worse performance. You should set canBlock == false only if
        you are certain ProcessMessage will not block (by, for instance,
        sending a new Message).

Properties public virtual bool CompletesSynchronously {get;}
    Gets whether the implementation of ProcessMessage is inherently
synchronous.
Property Value:
    true.
Remarks:
    See IMessageHandler for details.

Methods public virtual IAsyncResult BeginProcessMessage(Message message,
AsyncCallback callback, object state);
    Asynchronous begin for ProcessMessage.
Parameters:
    message: System.MessageBus.Message
        The Message to process.
    callback: System.AsyncCallback
        See Asynchronous Design Pattern.
    state: System.Object
        See Asynchronous Design Pattern.
Return Value:
    See Asynchronous Design Pattern
public virtual bool EndProcessMessage(IAsyncResult result);
    Asynchronous end for ProcessMessage.
Parameters:
    result: System.IAsyncResult
        See Asynchronous Design Pattern.
Return Value:
    true if the IMessageHandler has not and will not call Close ;
otherwise, false.
Remarks:
    See IMessageHandler for details.
public abstract bool ProcessMessage(Message message);
    Processes a Message.
Parameters:
    message: System.MessageBus.Message
        The Message to process.
Return Value:
    true if the IMessageHandler has not and will not call Close;
otherwise, false.
Remarks:
    See IMessageHandler for details.

IPort Interface
public interface IPort

An interface for a container object that has a notion of when it is open, when it is closed, and for how long it has been idle. An interface for Port and other "main" service components that handle lifetime inherit from.

Properties

TimeSpan IdlePeriod {get;}
bool IsOpen {get;}

Methods

IAsyncResult BeginClose(AsyncCallback callback, object state);
Parameters:
    callback: System.AsyncCallback
    state: System.Object
IAsyncResult BeginOpen(AsyncCallback callback, object state);

Parameters:
    callback: System.AsyncCallback
    state: System.Object
bool Close( );
bool EndClose(IAsyncResult result);
Parameters:
    result: System.IAsyncResult
void EndOpen(IAsyncResult result);
Parameters:
    result: System.IAsyncResult
void Open( );

IMessageProducer Interface
public interface IMessageProducer

Provides a base interface for registering an IMessageHandler that is called when there is a Message to process. An IMessageProducer is the complement to an IMessageHandler. An IMessageProducer is a Message generator. It provides a means to attach a Message consumer, (i.e., an IMessageHandler) as a property. When an IMessageProducer has a Message to process, it calls either ProcessMessage or {BEgin, End} ProcessMessage on the Handler property. Because IMessageProducer is a simple interface, no base class implementation is provided. ReceiveChannel is an example of an IMessageProducer.

Properties

IMessageHandler Handler {get; set;}
    Gets or sets the IMessageHandler to call.

IMessageQueue Interface
public interface IMessageQueue

Defines queue-like methods for message processing. This interface exposes methods to inspect the queue without changing it (Peek), retrieve a message from the queue (Receive), either with or without a timeout, as well as the corresponding asynchronous Begin/End methods. A class implementing this interface may also wish to implement IMessageHandler, allowing such a class to be plugged into the "push" callback style of message processing while exposing the "pull" calling style.

Methods

IAsyncResult BeginPeek(TimeSpan timeout, AsyncCallback callback, object state);
    Asynchronous begin for Peek.
Parameters:
    timeout: System.TimeSpan
        The maximum amount of time the method will wait before
failing.
    callback: System.AsyncCallback
        See Asynchronous Design Pattern.
    state: System.Object
        See Asynchronous Design Pattern.
Return Value:
    See Asynchronous Design Pattern.
IAsyncResult BeginReceive(TimeSpan timeout, AsyncCallback callback, object state);
    Asynchronous begin for Receive.
Parameters:
    timeout: System.TimeSpan
        The maximum amount of time the method will wait before
failing.
    callback: System.AsyncCallback -continued

| Methods |
|---|
| See Asynchronous Design Pattern.<br>    state: System.Object<br>        See Asynchronous Design Pattern.<br>    Return Value:<br>        See Asynchronous Design Pattern.<br>Message EndPeek(IAsyncResult result);<br>    Asynchronous end for Peek.<br>    Parameters:<br>        result: System.IAsyncResult<br>            See Asynchronous Design Pattern.<br>    Return Value:<br>        Either a message (first in the queue) or null (if none).<br>Message EndReceive(IAsyncResult result);<br>    Asynchronous end for Receive.<br>    Parameters:<br>        result: System.IAsyncResult<br>            See Asynchronous Design Pattern.<br>    Return Value:<br>        Either a message (first in the queue) or null (if none).<br>Message Peek( );<br>    Returns the first message in the queue (if any) without changing the queue.<br>    Return Value:<br>        Either a message (first in the queue) or null (if none).<br>    Remarks:<br>        Same behavior as Peek(new TimeSpan(0)).<br>Message Peek(TimeSpan timeout);<br>    Returns the first message in the queue (if any) without changing the queue.<br>    Parameters:<br>        timeout: System.TimeSpan<br>            The maximum amount of time the method will wait before failing.<br>    Return Value:<br>        Either a message (first in the queue) or null (if none).<br>Message Receive( );<br>    Removes the first message (if any) from the queue and returns the message.<br>    Return Value:<br>        Either a message (first in the queue) or null (if none).<br>    Remarks:<br>        Same behavior as Receive(TimeSpan.MaxValue).<br>Message Receive(TimeSpan timeout);<br>    Removes the first message (if any) from the queue and returns the message.<br>    Parameters:<br>        timeout: System.TimeSpan<br>            The maximum amount of time the method will wait before failing.<br>    Return Value:<br>        Either a message (first in the queue) or null (if none). |

MemoryMessageQueue Class public class MemoryMessageQueue:SyncMessageHandler, IMessageQueue Provides an in-memory queue of Message s. MemoryMessageQueue stores Message s in memory. It buffers as many Message s as the underlying Transport allows. A MemoryMessageQueue is a simple mechanism to convert the "push" callback style into a "pull" calling style for processing new Message s. By default, IMessageHandler s are called when there is a new Message to process—this is a "push" callback style. However, in some circumstances, it is useful to "pull", or poll for new Message s. A MemoryMessageQueue converts the "push" into the "pull" style.

EXAMPLES

// Port p;

MemoryMessageQueue q=new MemoryMessageQueue( );

p.ReceiveChannel.Handler=q;

p.Open( );

// Later

Message m=q.Peek( );

| Constructors |
|---|
| public MemoryMessageQueue( );<br>    Initializes a new instance of the MemoryMessageQueue class. |

| Methods |
|---|
| public IAsyncResult BeginPeek(TimeSpan timeout, AsyncCallback callback, object state);<br>    Asynchronous begin for Peek.<br>    Parameters:<br>        timeout: System.TimeSpan<br>            The maximum amount of time the method will wait before failing.<br>        callback: System.AsyncCallback<br>            See Asynchronous Design Pattern.<br>        state: System.Object<br>            See Asynchronous Design Pattern.<br>    Return Value:<br>        See Asynchronous Design Pattern.<br>public IAsyncResult BeginReceive(TimeSpan timeout, AsyncCallback callback, object state);<br>    Asynchronous begin for Receive.<br>    Parameters:<br>        timeout: System.TimeSpan<br>            The maximum amount of time the method will wait before failing.<br>        callback: System.AsyncCallback<br>            See Asynchronous Design Pattern.<br>        state: System.Object<br>            See Asynchronous Design Pattern.<br>    Return Value:<br>        See Asynchronous Design Pattern.<br>public Message EndPeek(IAsyncResult result);<br>    Asynchronous end for Peek.<br>    Parameters:<br>        result: System.IAsyncResult<br>            See Asynchronous Design Pattern<br>    Return Value:<br>        Either a Message (first in the MemoryMessageQueue) or null (if none).<br>public Message EndReceive(IAsyncResult result);<br>    Asynchronous end for Receive.<br>    Parameters:<br>        result: System.IAsyncResult<br>            See Asynchronous Design Pattern.<br>    Return Value:<br>        Either a Message (first in the MemoryMessageQueue) or null (if none).<br>public Message Peek( );<br>    Returns the first Message in the MemoryMessageQueue (if any) without changing the MemoryMessageQueue.<br>    Return Value:<br>        Either a Message (first in the MemoryMessageQueue) or null (if none).<br>    Remarks:<br>        Same behavior as Peek(new TimeSpan(0)).<br>public Message Peek(TimeSpan timeout);<br>    Returns the first Message in the MemoryMessageQueue (if any) without changing the MemoryMessageQueue.<br>    Parameters:<br>        timeout: System.TimeSpan<br>            The maximum amount of time the method will wait before failing.<br>    Return Value:<br>        Either a Message (first in the MemoryMessageQueue) or null (if none).<br>public override bool ProcessMessage(Message message);<br>    Processes a Message.<br>    Parameters:<br>        message: System.MessageBus.Message<br>            The Message to process.<br>    Return Value:<br>        true if the IMessageHandler has not and will not call Close ; otherwise, false. |

-continued

```
public Message Receive( );
    Removes the first Message (if any) from the
MemoryMessageQueue and returns the Message.
Return Value:
    Either a Message (first in the MemoryMessageQueue) or null (if
none).
Remarks:
    Same behavior as Receive(TimeSpan.MaxValue).
public Message Receive(TimeSpan timeout);
    Removes the first Message (if any) from the
MemoryMessageQueue and returns the Message.
Parameters:
    timeout: System.TimeSpan
        The maximum amount of time the method will wait before
        failing.
Return Value:
    Either a Message (first in the MemoryMessageQueue) or null (if
none).
```

MessageDispatcher Class public class MessageDispatcher: AsyncMessageHandler

A simple content-based Message dispatcher. This class implements a simple content-based Message switch. The input-flow of Messages into MessageDispatcher is provided by the IMessageHandler interface it implements. It can be plugged into any IMessageHandler chain (e.g., ReceiveChannel.Handler). The output-flow of Messages is governed by the set of {filter, handler} pairs registered with the instance. A party interested in a particular type of Message (e.g., a certain Message.Action) can add a (filter, handler) pair to the MessageDispatcher. If a Message arrives at the MessageDispatcher matching that filter, the Message will be handed to the registered handler.

Constructors

```
public MessageDispatcher( );
    Initializes a new instance of the MessageDispatcher class.
                        Properties
public FilterTable Filters {get;}
    Gets the FilterTable used for matching and dispatching Messages.
Property Value:
    The FilterTable used for matching and dispatching Messages.
                        Methods
public void Add(Filter filter, IMessageHandler handler);
    Adds a "route" to the MessageDispatcher.
Parameters:
    filter: System.MessageBus.Filter
        The Filter to apply to incoming Messages.
    handler: System.MessageBus.IMessageHandler
        The IMessageHandler to call if the above filter matches on
        an incoming Message.
Exceptions:
    ArgumentNullException
        If filter or handler is null.
public override IAsyncResult BeginProcessMessage(Message message,
AsyncCallback callback, object state);
    When overriden in a derived class, begins processing a Message
being sent.
Parameters:
    message: System.MessageBus.Message
        The Message to process.
    callback: System.AsyncCallback
        See Asynchronous Design Pattern.
    state: System.Object
        See Asynchronous Design Pattern.
Return Value:
    See Asynchronous Design Pattern.
Remarks:
    See IMessageHandler for details on ProcessMessage.
```

```
Exceptions:
    ArgumentNullException
        If message is null.
public override bool EndProcessMessage(IAsyncResult result);
    Completes processing of a Message.
Parameters:
    result: System.IAsyncResult
        See Asynchronous Design Pattern.
Return Value:
    true if the SendChannel has not and will not call Close ; otherwise,
false.
Remarks:
    See IMessageHandler for details on ProcessMessage.
protected virtual FilterCollection ProcessMatches(FilterCollection
matches);
    When overridden in a derived class, provides a mechanism for
inspecting the matching filters before dispatching Messages.
Parameters:
    matches: System.MessageBus.FilterCollection
        The set of matching filters.
Return Value:
    Useful for choosing the best match out of a set of possible matches.
public void Remove(Filter filter);
    Removes a "route" from the MessageDispatcher.
Parameters:
    filter: System.MessageBus.Filter
        The filter to be removed.
Exceptions:
    ArgumentException
        If filter is null, or if filter.Tag is not an IMessageHandler.
```

Ports

Port Class public sealed class Port: IPort

Represents an endpoint of communication, abstracting transport-level connectivity. Instance members are not guaranteed to be thread-safe. A Port represents an endpoint of communication, or a SOAP node. It encapsulates the underlying messaging and network infrastructure, similar to a Berkeley socket. Messages are sent via a SendChannel, travel to another SOAP node via a Transport. Messages are received via a Port's ReceiveChannel.

Port concepts include:

Identity—all Ports have an identity (IdentityRole) which is used to uniquely identify it. The port can have more than one identity, specified by its RoleSet. The IdentityRole, however, should be globally unique. If a Port is created without an identity, an Anonymous one will be provided.

Receive channel—this channel represents the channel on which messages arrive. By setting the handler property of the ReceiveChannel, an application can register to process messages that arrive on this port. See IMessageHandler for more details.

Send channel—this channel provides synchronous and asynchronous methods for delivering addressed messages. In order to send unaddressed messages, use CreateSendChannel to create an instance of a SendChannel targeted towards a particular address. SendChannels have a number of configurable parameters to specify how the message is sent.

Transports—the !TransportCollection is the set of transports which can be used to physically move messages through a medium, whether it is a network wire, a named pipe, or a sql database.

Formatters—the !MessageFormatterCollection is the set of !Formatter objects which can be used to govern how a message is converted to/from a stream of bytes.

Extensions—ports contain a collection of extensions, which provide an extensibility point for processing messages prior to the messages arriving on the receive channel. See PortExtension and !PortExtensionsCollection for more information.

Statistics—ports provide a mechanism to measure bytes/messages sent/received.

ErrorEvent—the error event can be hooked to listen for any errors that occur during send or receive, or any out of band errors that might occur (failing an accept for instance).

Ports can be configured and then opened in order to allow messages to be sent and received. Once a port is open, most configuration settings become immutable. A port should be closed by calling Close in order to gracefully shutdown the port and ensure that all sent data is flushed. Once closed, a Port cannot be reopened.

---
Constructors
--- public Port( );
    Initializes a new instance of the Port class with default parameters and an anonymous IdentityRole.
Remarks:
    This is equivalent to calling Port(new AnonymousUri( )). An AnonymousUri is a non-routable guid of the form uuid:1111-2222-3333-444455556666. This is somewhat equivalent to the notion of ephemeral ports in TCP, as opposed to well-known ports. With an anonymous Port, an application will be able to initiate an exchange of Messages with other entities in the world, but they will be unable to initiate an exchange of. Messages with the anonymous Port.
    When a MessageBus node receives a Message where the previous-hop address is an AnonymousUri, the ConnectionManager will associate that AnonymousUri with the underlying connection upon which it arrived. To reply to the Message, the node should reply to the Message as normal (placing the previous-hop address as the next-hop address in the Message's PathHeader). When the reply reaches the Transport layer, it will be sent out over the connection upon which the original Message was received. If that connection is no longer available, an EndpointNotFoundException will occur.
    Note that if one wishes to manually-address (see Port.SendChannel) a Message that is being sent from an anonymous Port, one must add the IdentityRole to the ReversePath on the PathHeader. Failing to do so will cause an ArgumentException on the server, complaining that the scheme 'uuid' is not understood.
    See Port(Uri identityRole) for more details on what happens during Port initialization.
public Port(Uri identityRole);
    Initializes a new instance of the Port class, using the specified Uri as the !IdentityRole.
Parameters:
    identityRole: System.Uri
        Sets !IdentityRole to the supplied !IdentityRole.Uri'/>
Remarks:
    When the Port is created, its member collections are populated with defaults. These defaults include:
        Extensions (DidUnderstandPortExtension, ReceivePortExtension, RoleSetPortExtension)
        Transports (CrossProcessTransport, HttpTransport, InProcessTransport, Pop3Transport, SmtpTransport, SoapTransport, TcpTransport)
        Formatters (TextXmlFormatter)
        HeaderTypes (ActionHeader, MessageIdHeader, PathHeader, RelatesToHeader, ReplyInfoHeader, ToHeader)
        RoleSet (Roleset.All)
        CloseTimeout (60 seconds)
Exceptions:
    ArgumentNullException
        If identityRole is null.

---
Properties
--- public TimeSpan CloseTimeout {get; set;}
    Gets or sets the amount of time the port will wait for graceful closure.
Property Value:
    A TimeSpan object representing the amount of time in which the Close method has to finish.

-continued

Remarks:
    There may still be data flowing out of the Port after Close is called.
    The CloseTimeout governs the amount of time the Port has to transmit unsent data after the Port has been closed. By default, the value is set to 180 seconds. If the Port has not finished transmitting all data by the end of the CloseTimeout, the Port will close prematurely, possibly resulting in unsent data.
public PortExtensionCollection Extensions {get;}
    Gets or sets a collection containing all port extensions configured on the port.
Property Value:
    A !PortExtensibleCollection containing all PortExtension objects configured on the Port instance.
Remarks:
    A PortExtension represents a point of extensibility in the Port's pipeline. PortExtensions perform operations on Messages as they arrive and/or leave a Port.
public MessageFormatterCollection Formatters {get;}
    Gets the collection of message formatters that are available to the port.
Property Value:
    The !MesssageFormatterCollection of !MessageFormatter objects that are available to the Port.
Remarks:
    A !MessageFormatter governs how a Message is converted to and from a Stream.
public MessageHeaderTypeCollection HeaderTypes {get;}
    Gets the collection of message header types representing SOAP header blocks, that should be strongly-typed when a messsage is received.
Property Value:
    The MessageHeaderTypeCollection containing MessageHeaderType objects representing SOAP Header blocks, that should be strongly-typed when a Message is received.
Remarks:
    When a Message is received, the Port will attempt to parse each SOAP Header block on the Message. For each SOAP header block on the message, it will first try to convert the header into an appropriate MessageHeaderType from HeaderTypes. If no matching type can be found, the SOAP Header will be typed as a !TextXmlNodeHeader.
    Note that MessageHeaderType s that have been registered with the Port (via this collection) are significantly easier and faster to retrieve than untyped headers.
public Uri IdentityRole {get; set;}
    Gets or sets the identity role of the port.
Property Value:
    A Uri representing the IdentityRole of the Port.
Remarks:
    Every Port has an IdentityRole, which should be a globally unique name. The IdentityRole takes the form of a Uri and is a role in the sense of SOAP roles. The IdentityRole can be used to target messages at a given instance of a service or application. For instance, the SOAP role soap://microsoft.com/webservices may be implemented by a farm of servers, named ws1.microsoft.com through ws8.microsoft.com. In a common scenario, the !IdentityRole of ws1.microsoft.com would be soap://ws1.microsoft.com/webservices, and the role soap://microsoft.com/webservices would be in the RoleSet of the Port.
    The IdentityRole is generally set on Port instantiation, but may be re-specified at any point up until the Port is opened.
    The IdentityRole may also be used to create appropriate TransportAddresses for the Port if no other TransportAddresses have been configured at the time the Port instance is opened, and if the IdenityRole defines a known scheme which maps to a particular type of TransportAddress. In the above example, if a node's IdentityRole was soap://ws1.microsoft.com/webservices and that node had a TcpTransport registered with its Port, then on Port.Open( ), the TransportAddress soap.tcp://ws1.microsoft.com/webservices would be added to the Port.TransportAddresses.
Exceptions:
    ArgumentNullException
        The IdentityRole is null.
    InvalidOperationException
        The Port is open.

-continued

```
public TimeSpan IdlePeriod {get;}
    Gets the amount of time since the open port processed
    a message.
Property Value:
    A TimeSpan object.
Exceptions:
    InvalidOperationException
        The Port is not open.
public bool IsOpen {get;}
    Gets a value indicating whether or not the port is open.
Property Value:
    true if the Port is currently open; otherwise, false.
public ReceiveChannel ReceiveChannel {get;}
    Gets the channel that processes messages received by the port.
Property Value:
    The ReceiveChannel that processes Message objects received
by the Port.
Remarks:
    All incoming messages on this Port instance will be delivered
through this channel. !PortExtensions will be executed in the Pipeline
associated with this channel as the message arrives. Applications may
"subscribe" to receive incoming messages by setting the Handler
property of this ReceiveChanne l.
Exceptions:
    InvalidOperationException
        Handler is set while the port is open.
public IRoleSet RoleSet {get; set;}
    Gets or sets the set of roles that this port can play.
Property Value:
    The RoleSet that this Port instance can play.
Remarks:
    A RoleSet defines a membership function. The default value
for a Port instance is All. This set will always return true
for any role.
    The RoleSet controls the "view" of the
message that this Port will see. Every SOAP header block is
targeted at a role (or, implicitly, targeted at UltimateReceiver).
When retrieving a MessageHeader from a message, only those
MessageHeaders targeted at a role in Port.RoleSet will be
retrieved.
Exceptions:
    ArgumentNullException
        value is null.
public SendChannel SendChannel {get;}
    Gets the default send channel for processing sent messages.
Property Value:
    The default SendChannel used for processing messages sent
via this Port.
Remarks:
    The default SendChannel will send addressed Messages through
the send pipeline. It will not add addressing information to
a Message. If using this channel, callers must provide appropriate
addressing headers either explicitly, or through some other means.
For example, a message created by calling Message.CreateReply( )
will contain the addressing headers necessary for sending the
message back to the sender of the request.
    To create a SendChannel that will automatically add addressing
information to a Message on send, investigate CreateSendChannel.
    public MessageIOStatistics Statistics {get;}
    Gets various message processing statistics for the port.
Property Value:
    A MessageIOStatistics object, representing various message
processing statistics for the Port.
Remarks:
    For Transport -specific statistics, see Statistics. Statistics
aggregates the Transport for all Transport s in Statistics.
public TransportAddressCollection TransportAddresses {get;}
    Gets a collection containing all the transport addresses associated
with an instance of the port.
Property Value:
    A !TransportAddressCollection containing all the transport
addresses associated with the Port.
Remarks:
    A !TransportAddress define a resolvable address. Transports
"listen" for incoming messages or connections at the
location defined by the transport address. Transport instances may
listen for messages on multiple addresses. A single TransportAddress
may provide information for multiple !Transport instances. For
example, the !SoapTransportAddress is supported by !TcpTransport,
!HttpTransport and !Pop3Transport. Some transport addresses are
supported only by a single Transport (e.g.,
!HttpTransport Address).
    public TransportCollection Transports {get;}
    Gets or sets a collection containing all of the transports
associated with the port.
Property Value:
    A !TransportCollection containing all Transports associated with
this Port.
Remarks:
    Transports are responsible for managing the transport-level
details of carrying messages to and from this Port instance.
Transports are the conveyence means by which messages travel
between Port instances. Examples of Transports include
!TcpTransport, !HttpTransport, !CrossProcessTransport and
!InProcessTransport. Transports can send and/or receive !Messages.
Typically, there is one Transport instance per protocol.
                                Methods public IAsyncResult BeginClose(AsyncCallback callback, object state);
    Initiates an asynchronous operation to close this port. The
operation has a specified state object to provide information
associated with the operation throughout its lifetime. This method
receives notification of the
identity of the event handler for the operation through a specified
callback.
Parameters:
    callback: System.AsyncCallback
        The !AsyncCallback that will receive the notification of the
        asynchronous close operation completion.
    state: System.Object
        A state Object containing information associated with the
        asynchronous close operation.
Return Value:
    An IAsyncResult that references the asynchronous close
    operation.
Remarks:
    Begins closing the !Transports and !PortExtension objects
associated with the !Port.
Exceptions:
    InvalidOperationException
        The !Port is not open.
public IAsyncResult BeginOpen(AsyncCallback callback,
object state);
    Initiates an asynchronous operation to open this port. The
operation has a specified state object to provide information
associated with the operation throughout its lifetime. This method
receives notification of the identity of the event handler for the
operation through a specified callback.
Parameters:
    callback: System.AsyncCallback
        The AsyncCallback that will receive the notification of the
        asynchronous open operation completion.
    state: System.Object
        A state Object containing information associated with the
        asynchronous open operation.
Return Value:
    The IAsyncResult that references the asynchronous open
    operation.
Remarks:
    Begins opening the !Transports and !PortExtension objects
associated with the !Port.
    If there are no !TransportAddresses defined on the Port, a set of
default addresses based upon the IdentityRole will be created. If any
TransportAddress is defined, default addresses based upon the
IdentityRole will not be created.
    ReceiveChannel is opened, but SendChannel is not.
SendChannel is opened on the first use of the SendChannel.
Exceptions:
    InvalidOperationException
        The !Port is already open.
    public bool Close( );
        Closes the port and its underlying infrastructure.
Return Value:
    true if the closing of the Port was graceful; otherwise, false.
Remarks:
    If there was any data left to be sent through the Port when
CloseTimeout expires, this will return false, indicating that
the close was not graceful. Otherwise, it will return true.
```

-continued

After being closed, no more messages can be sent, and no more
messages will be received on this Port instance. Once closed,
a Port cannot be reopened.
Exceptions:
    InvalidOperationException
        The Port is not open.
    PortIOException
        There was an error closing the Port.
public SendChannel CreateSendChannel(ResourceReference rr);
    Creates a SendChannel for sending messages to the specified
recipient.
Parameters:
    rr: System.MessageBus.ResourceReference
        A ResourceReference specifying the destination for
        messages sent on this channel.
Return Value:
    A SendChannel that can be used to send messages to the
specified recipient.
Remarks:
    Message s sent on this channel must not contain any addressing
information ( ToHeader, ReplyInfoHeader, PathHeader ).
Exceptions
    ArgumentNullException
        If rr is null.
public SendChannel CreateSendChannel(Uri target);
    Creates a SendChannel for sending messages to the specified
recipient.
Parameters:
    target: System.Uri
        Destinations contained in an array of type Uri for messages
        sent on the channel.
Return Value:
    A SendChannel that can be used to send messages to the
specified recipient.
Remarks:
    Message s sent on this channel must not contain any addressing
information ( ToHeader, ReplyInfoHeader, PathHeader ).
Exceptions:
    ArgumentNullException
        If target is null.
    public SendChannel CreateSendChannel(Uri[] targets);
        Creates a SendChannel for sending messages to a set of
        recipients.
Parameters:
    targets: System.Uri[]
        Destinations contained in an array of type Uri for messages
        sent on the channel.
Return Value:
    A SendChannel that can be used to send messages to the set of
specified recipients.
Remarks:
    Message s sent on this channel must not contain any addressing
information ( ToHeader, ReplyInfoHeader, PathHeader ).
Exceptions:
    ArgumentNullException
        If targets is null.
    ArgumentException
        If an element of targets is null.
public SendChannel CreateSendChannel(ResourceReference rr, Uri
from);
    Creates a SendChannel for sending messages from a
specific address to the specified recipient.
Parameters:
    rr: System.MessageBus.ResourceReference
        A ResourceReference specifying the destination for
        Messages sent on this channel.
    from: System.Uri
        Where replies should be sent. If null, use IdentityRole.
Return Value:
    A SendChannel that can be used to send messages to the
specified recipient.
Remarks:
    Message s sent on this channel must not contain any addressing
information ( ToHeader, ReplyInfoHeader, PathHeader ).
Exceptions:
    ArgumentNullException
        If rr is null.

-continued public SendChannel CreateSendChannel(Uri target, bool forward);
    Creates a SendChannel for sending messages to the specified
recipient.
Parameters:
    target: System.Uri
        Destinations contained in an array of type Uri for messages
        sent on the channel.
    forward: System.Boolean
        true if forwarding semantics are to be applied to messages
        sent on the channel; otherwise, false.
Return Value:
    A SendChannel that can be used to send messages to the
specified recipient.
Remarks:
    Message s sent on this channel must not contain any addressing
information ( ToHeader, ReplyInfoHeader, PathHeader ).
    If forward is set to true, then Message s sent on this channel
must contain complete addressing information ( ToHeader,
ReplyInfoHeader, PathHeader ).
    If forward is set to false, then Message s sent on this channel
must not contain any addressing information ( ToHeader,
ReplyInfoHeader, PathHeader ).
Exceptions:
    ArgumentNullException
        If target is null.
public SendChannel CreateSendChannel(Uri[] targets, bool forward);
    Creates a SendChannel for sending messages to a set of
    recipients.
Parameters:
    targets: System.Uri[]
        Destinations contained in an array of type Uri for messages
        sent on the channel.
    forward: System.Boolean
        true if forwarding semantics are to be applied to messages
        sent on the channel; otherwise, false.
Return Value:
    A SendChannel that can be used to send messages to the set of
specified recipients.
Remarks:
    If forward is set to true, then Message s sent on this channel
must contain complete addressing information ( ToHeader,
ReplyInfoHeader, PathHeader ).
    If forward is set to false, then Message s sent on this channel
must not contain any addressing information ( ToHeader,
ReplyInfoHeader, PathHeader ).
Exceptions:
    ArgumentNullException
        If targets is null.
    ArgumentException
        If an element of targets is null.
public SendChannel CreateSendChannel(Uri[] targets, bool
forward, Uri from);
    Creates a SendChannel for sending messages from a specific
address to a set of recipients.
Parameters:
    targets: System.Uri[]
        Destinations contained in an array of type Uri for messages
        sent on the channel.
    forward: System.Boolean
        true if forwarding semantics are to be applied to messages
        sent on the channel; otherwise, false.
    from: System.Uri
        Uri to which replies should be sent. If null, use
        IdentityRole.
Return Value:
    A SendChannel that can be used to send messages to the set of
specified recipients.
Remarks:
    If forward is set to true, then Message s sent on this channel
must contain complete addressing information ( ToHeader,
ReplyInfoHeader, PathHeader ).
    If forward is set to false, then Message s sent on this channel
must not contain any addressing information ( ToHeader,
ReplyInfoHeader, PathHeader ).
Exceptions:
    ArgumentNullException
        If targets is null.
    ArgumentException
        If an element of targets is null.

-continued

```
public SendChannel CreateSendChannel(Uri[] targets, bool
forward, Uri from, MessageHeader[] headers);
    Creates a SendChannel for sending messages from a specific
address to a set of recipients.
Parameters:
    targets: System.Uri[]
        Destinations contained in an array of type Uri for messages
        sent on the channel.
    forward: System.Boolean
        true if forwarding semantics are to be applied to messages
        sent on the channel; otherwise, false.
    from: System.Uri
        Uri to which replies should be sent. If null, use
        IdentityRole.
    headers: System.MessageBus.MessageHeader[]
        An array of type MessageHeader containing a set of headers
        that will automatically be added to every message sent on
        the send channel created.
Return Value:
    A SendChannel that can be used to send messages to the set of
specified recipients.
Remarks:
    If forward is set to true, then Message s sent on this channel
must contain complete addressing information ( ToHeader,
ReplyInfoHeader, PathHeader ).
    If forward is set to false, then Message s sent on this channel
must not contain any addressing information ( ToHeader,
ReplyInfoHeader, PathHeader ).
    Each MessageHeader in headers will be added to all outgoing
Message s sent on this SendChannel.
Exceptions:
    ArgumentNullException
        If targets or headers is null.
    ArgumentException
        If an element of targets or headers is null.
public SendChannel CreateSendChannel(Uri[] targets, bool
forward, Uri from, MessageHeader[] headers,
MessageHeader[] replyHeaders);
    Creates a send channel for sending messages from a specific
address to a set of recipients.
Parameters:
    targets: System.Uri[]
        Destinations contained in an array of type Uri for messages
        sent on the channel.
    forward: System.Boolean
        true if forwarding semantics are to be applied to messages
        sent on the channel; otherwise, false.
    from: System.Uri
        Uri to which replies should be sent. If null, use
        IdentityRole.
    headers: System.MessageBus.MessageHeader[]
        An array of type MessageHeader containing a set of headers
        that will automatically be added to every message sent on
        the send channel created.
    replyHeaders: System.MessageBus.MessageHeader[]
        An array of type MessageHeader containing a set of headers
        that will be automatically added to the ReplyInfoHeader of every
        message sent on this SendChannel.
Return Value:
    A SendChannel that can be used to send messages to the set of
specified recipients.
Remarks:
    If forward is set to true, then messages sent on this channel
must contain complete addressing information: ToHeader,
ReplyInfoHeader, PathHeader. If forward is set to false, then
messages sent on this channel must not contain any of this addressing
information.
    Each MessageHeader in headers will be added to all outgoing
messages sent on this SendChannel. Each MessageHeader in
replyHeaders will be added to the ReplyInfoHeader of all outgoing
Message s sent on this SendChannel. Any SOAP node replying to a
Message is required to promote the MessageHeader s in the
ReplyInfoHeader to full SOAP Headers in the reply. This mechanism
could be used to associate the reply to a Message with the
SendChannel which sent the original Message.
Exceptions:
    ArgumentNullException
        targets,headers, or replyHeaders is null.
    ArgumentException
        An element of targets, headers, or replyHeaders is null.
public bool EndClose(IAsyncResult result);
    Completes an asynchronous close of the port.
Parameters:
    result: System.IAsyncResult
        The IAsyncResult that identifies the asynchronous close
        operation to finish, and from which to retrieve an end result.
Return Value:
    true if the close was graceful; otherwise, false.
Remarks:
    If there was any data left to be sent through the Port when
CloseTimeout expires, this will return false, indicating that
the close was not graceful. Otherwise, it will return true.
    After being closed, no more messages can be sent, and no more
messages will be received on this Port instance. Once closed,
a Port cannot be reopened.
Exceptions:
    PortIOException
        There was an error closing the Port.
public void EndOpen(IAsyncResult result);
    Completes an asynchronous open of the port.
Parameters:
    result: System.IAsyncResult
        The IAsyncResult that identifies the asynchronous close
        operation to finish, and from which to retrieve an end result.
Remarks:
    When this completes, messages can now be sent and received on
this instance.
Exceptions:
    PortIOException
        There was an error opening the Port.
public void Open( );
    Opens the Port and its underlying infrastructure.
Remarks:
    If there are no TransportAddresses defined on the Port, a set of
default addresses based upon the IdentityRole will be created. If any
TransportAddress is defined, default addresses based upon the
IdentityRole will not be created.
    Port.ReceiveChannel is opened, but Port.SendChannel is not.
Port.SendChannel is opened on the first use of the SendChannel.
    When this completes, messages can now be sent and received on
this instance.
Exceptions:
    InvalidOperationException
        The Port is already open.
    PortIOException
        There was an error opening the Port.
```

Events

```
public event ErrorEventHandler Error;
    Adds or removes an error event handler from this port.
Remarks:
    Many operations may occur outside the context of a user
call. For instance, when receiving a message from a remote
Port, the message is read, deserialized and processed by the
messaging system before ever being delivered to the application.
If an error occurs during this process, the Exception associated
with the error is reported to all handlers subscribed to this event.
Exceptions:
    InvalidOperationException
        The Port is already open.
```

PortSendStages Class public class PortSendStages

Defines the set of pre-defined stages for a Port's SendChannel. Defines the initial stages for a Port's SendChannel. Stages are in the following order: Spy (first), Policy, Security, SecureRequest, Transmit.

| Constructors |
|---| public PortSendStages( );

| Properties |
|---| public static Stage Policy {get;}
    Where policy is retrieved and applied to the Message.
Property Value:
    http://schemas.microsoft.com/mb/2002/07/PortSendStages.Policy
public static Stage SecureRequest {get;}
    Where the security information in a Request Message is added.
Property Value:
    http://schemas.microsoft.com/mb/2002/07/PortReceiveStages.SecureRequest
public static Stage Security {get;}
    Where the Message is formulated to be compliant with the recipient's security requirements. This includes signing, encrypting, and attaching relevant tokens that will be used by the recipient to make authentication and authorization decisions.
Property Value:
    http://schemas.microsoft.com/mb/2002/07/PortSendStages.Security
public static Stage Spy {get;}
    Where debugging and/or spy mechanisms hook the Message.
Property Value:
    http://schemas.microsoft.com/mb/2002/07/PortSendStages.Spy
public static Stage Transmit {get;}
    Where the Message is transmitted to another endpoint.
Property Value:
    http://schemas.microsoft.com/mb/2002/07/PortSendStages.Transmit

| Methods |
|---| public static Stage[] GetStages( );
    Returns the initial set of Port SendChannel stages in order.
Return Value:
    An array of stages, ordered according to their relative place in the pipeline.

PortReceiveStages Class
public class PortReceiveStages
Defines the set of pre-defined stages for a Port's ReceiveChannel. Defines the initial stages for a Port's ReceiveChannel. Stages are in the following order: Spy (first), PerfCounters, RoleSet, SecureReply, Security, Policy, SpyPostSecurity, RuleAdministration, Route, DidUnderstand, ReliableMessaging, ReceiveReply, DatagramBinder, Handler (last).

| Constructors |
|---| public PortReceiveStages( );

| Properties |
|---| public static Stage DatagramBinder {get;}
Property Value:
    http://schemas.microsoft.com/mb/2002/07/PortReceiveStages.DatagramBinder
public static Stage DidUnderstand {get;}
    Where MessageHeader s that are marked MustUnderstand are checked to see if they were, in fact, processed by some IMessageHandler.
Property Value:
    http://schemas.microsoft.com/mb/2002/07/PortReceiveStages.DidUnderstand
public static Stage Handler {get;}
    Where the application IMessageHandler processes the Message.
Property Value:
    http://schemas.microsoft.com/mb/2002/07/PortReceiveStages.Handler
public static Stage PerformanceCounters {get;}
    Where performance metrics related to the number and size of Messages passing through the Port are captured.
Property Value:
    http://schemas.microsoft.com/mb/2002/07/PortReceiveStages.PerformanceCounters
public static Stage Policy {get;}
    Where unsolicted incoming policies are extracted from the Message and stored in the policy cache, and where GetPolicy requests are handled.
Property Value:
    http://schemas.microsoft.com/mb/2002/07/PortReceiveStages.Policy
public static Stage ReceiveReply {get;}
    Where Reply Message s are detected and passed to the waiting request call.
Property Value:
    http://schemas.microsoft.com/mb/2002/07/PortReceiveStages.ReceiveReply
public static Stage ReliableMessaging {get;}
    Where Message with Reliable Messaging headers are processed. This stage will take control of RM Message s (stopping the Message from reaching subsequent IMessageHandler.
Property Value:
    http://schemas.microsoft.com/mb/2002/07/PortReceiveStages.ReliableMessaging
public static Stage RoleSet {get;}
    Where the RoleSet that the Port plays is added to the Message (in the form of a MessageProperty).
Property Value:
    http://schemas.microsoft.com/mb/2002/07/PortReceiveStages.RoleSet
public static Stage Route {get;}
    Where the Message is matched against routes in the router. If a match occurs, the Message is forwarded to the next hop.

-continued

Property Value:
    http://schemas.microsoft.com/mb/2002/07/PortReceiveStages.Route
public static Stage RuleAdministration {get;}
    Where RuleAdministration Message s are processed (e.g., routing rule).
Property Value:
    http://schemas.microsoft.com/mb/2002/07/PortReceiveStages.RuleAdministration
    public static Stage SecureReply {get;}
    Where the security information in a Reply Message is processed and
verified.
Property Value:
    http://schemas.microsoft.com/mb/2002/07/PortReceiveStages.SecureReply
public static Stage Security {get;}
    Where the security header of the Message is processed for signature and
encryption requirements, and where token processing and authentication and
authorization decisions are made.
Property Value:
    http://schemas.microsoft.com/mb/2002/07/PortReceiveStages.Security
public static Stage Spy {get;}
    Where debugging and/or spy mechanisms hook the Message before
Security.
Property Value:
    http://schemas.microsoft.com/mb/2002/07/PortReceiveStages.Spy
public static Stage SpyPostSecurity {get;}
    Where debugging and/or spy mechanisms hook the Message after Security.
This is for processing (e.g., inspecting the MessageContent) that must happen after
the Message has gone through security processing.
Property Value:
    http://schemas.microsoft.com/mb/2002/07/PortReceiveStages.Spy Methods public static Stage[] GetStages( );
    Returns the initial set of Port ReceiveChannel stages in order.
Return Value:
    An array of stages, ordered according to their relative place in the
pipeline.

PortIOException Class public class PortIOException: IOException

A PortIOException is generated when an exception occurs during the opening or closing of a Port. Thread Safety: Single-threaded.

Constructors public PortIOException( );
    Initializes a new instance of the PortIOException class.
public PortIOException(string s);
    Initializes a new instance of the PortIOException class.
Parameters:
    s: System.String
        A description of the exception.
protected PortIOException(SerializationInfo info, StreamingContext
context);
    Initializes a new instance of the PortIOException class with
serialized data.
Parameters:
    info: System.Runtime.Serialization.SerializationInfo
        The SerializationInfo that holds the serialized object data
        about the exception being thrown.
    context: System.Runtime.Serialization.StreamingContext
        The StreamingContext that contains contextual information
        about the source or destination.
Exceptions:
    ArgumentNullException
        If info is null.
public PortIOException(string s, Exception innerException);
    Initializes a new instance of the PortIOException class.
Parameters:
    s: System.String
        A description of the exception.
    innerException: System.Exception
        The exception that caused the PortIOException to be
generated.

MessageIOException Class public class MessageIOException: IOException

A MessageIOException is generated when an exception occurs during the reading or writing of a Message at the Formatter layer. Thread Safety: Single-threaded.

Constructors public MessageIOException( );
    Initializes a new instance of the MessageIOException class.
public MessageIOException(string s);
    Initializes a new instance of the MessageIOException class.
Parameters:
    s: System.String
        A description of the exception.
protected MessageIOException(SerializationInfo info, StreamingContext
context);
    Initializes a new instance of the MessageIOException class with
serialized data.
Parameters:
    info: System.Runtime.Serialization.SerializationInfo
        The SerializationInfo that holds the serialized object data
        about the exception being thrown.
    context: System.Runtime.Serialization.StreamingContext
        The StreamingContext that contains contextual information
        about the source or destination.
Exceptions:
    ArgumentNullException
        If info is null.
public MessageIOException(string s, Exception innerException);
    Initializes a new instance of the MessageIOException class.
Parameters:
    s: System.String
        A description of the exception.
    innerException: System.Exception
        The exception that caused the MessageIOException to be
generated.

Port Extensions

PortExtension Class public abstract class PortExtension

Provides an extensibility point for processing messages that flow through a Port. Abstractly, a PortExtension describes an aspect of message processing for a Port. Concretely, a PortExtension describes inputs to a PipelineBuilder for each of the channel types supported by a Port.

Specifically, there are three kinds of methods a PortExtension supports for each channel type:

| Method | Does | May be empty? | Passed to |
|---|---|---|---|
| GetXxxAliases | Returns a list of StageAlias es (i.e., refinements) the PortExtension defines. These define new Stage s and their ordering. | yes | #ctor (the method that creates and initializes the object instance) |
| GetXxxStages | Returns Stage s that the PortExtension actually adds IMessageHandler s to. Some Stage s may be unused by a particular PortExtension. | yes | #ctor |
| GetXxxHandlers | Returns IMessageHandler s to add. There must be exactly as many IMessageHandler s as Stage s returned by "get stages", and the order of IMessageHandler s corresponds to the order of the Stage s returned by "get stages". That is, the first IMessageHandler goes in the first Stage, the second in the second, and so on. | yes | ToPipeline |

Constructors protected PortExtension( );

Properties public Port Port {get;}
    Gets the Port to which this PortExtension was added.
Property Value:
    The Port to which this PortExtension was added.
Remarks:
    When a PortExtension is added to a Port, the Port property is set with that Port.

Methods public virtual IMessageHandler[] CreateReceiveHandlers( );
    IMessageHandler s to add to the ReceiveChannel.
Return Value:
    An ordered list of zero or more IMessageHandler s to add to the ReceiveChannel.
Remarks:
    There must be exactly as many IMessageHandler s as Stage s returned by GetReceiveStages, and the order of IMessageHandler s must correspond to the order of the Stage s returned by GetReceiveStages.
public virtual IMessageHandler[] CreateSendHandlers( );
    IMessageHandler s to add to a send channel.

-continued

Return Value:
    An ordered list of zero or more IMessageHandler s to add to a send channel.
Remarks:
    There must be exactly as many IMessageHandler s as Stage s returned by GetSendStages, and the order of IMessageHandler s must correspond to the order of the Stage s returned by GetSendStages.
public virtual StageAlias[] GetReceiveAliases( );
    Stage Alias es for the ReceiveChannel.
Return Value:
    A list of zero or more Stage Alias es.
Remarks:
    These define refinements of Stage s for the ReceiveChannel.
public virtual Stage[] GetReceiveStages( );
    ReceiveChannel Stage s to which this PortExtension adds IMessageHandler s.
Return Value:
    A list of zero or more Stage s.
Remarks:
    Returns Stage s of the ReceiveChannel that the PortExtension actually adds IMessageHandler s to.
public virtual StageAlias[] GetSendAliases( );
    Stage Alias es for a SendChannel.
Return Value:
    A list of zero or more StageAlias es.
Remarks:
    These define refinements of Stage s for a send channel.
public virtual Stage[] GetSendStages( );
    Send channel Stage s to which this PortExtension adds IMessageHandler s.
Return Value:
    A list of zero or more Stage s.
Remarks:
    Returns Stage s of a send channel that the PortExtension actually adds IMessageHandler s to.
public virtual void OnClosed( );
    Complete closing the PortExtension.
Remarks:
    If a PortExtension is registered with a Port, this will be called on Port.EndClose. The PortExtension should clean up all state before the function returns. After this function returns, the PortExtension is considered closed.
public virtual bool OnClosing(TimeSpan timeout);
    Begin closing the PortExtension.
Parameters:
    timeout: System.TimeSpan
        A TimeSpan object representing the amount of time this PortExtension has to close gracefully.
Remarks:
    If a PortExtension is registered with a Port, this will be called on Port.BeginClose. This PortExtension has timeout time to gracefully close the PortExtension.
public virtual void OnOpened( );
    Complete closing the PortExtension.
Remarks:
    If a PortExtension is registered with a Port, this will be called on Port.EndOpen. Once this function returns, the Port is largely immutable (see Port for specific member details).
public virtual void OnOpening( );
    Begin opening the PortExtension.
Remarks:
    If a PortExtension is registered with a Port, this will be called on Port.BeginOpen.

PortExtensionCollection Class public class PortExtensionCollection: CollectionBase Represents a collection of instances of PortExtensions. Thread Safety: Single-threaded. See also Port.Extensions.

Properties public PortExtension this[int index] {get; set;}
    Get or set the PortExtension at the specified index.
Property Value:
    The PortExtension at the specified index.

Exceptions:
ArgumentNullException
If value is null on a set operation.
ArgumentOutOfRangeException
If index is less than 0 or greater than or equal to Count.
Methods public int Add(PortExtension extension);
Adds a PortExtension to the end of the PortExtensionCollection.
Parameters:
extension: System.MessageBus.PortExtension
Return Value:
The index into which the type was added.
public bool Contains(PortExtension extension);
Determines whether the PortExtensionCollection contains the specified PortExtension.
Parameters:
extension: System.MessageBus.PortExtension
Return Value:
true if the PortExtensionCollection contains the specified type ; otherwise, false.
public void CopyTo(PortExtension[] array, int index);
Copies the entire PortExtensionCollection to a compatible one-dimensional Array, starting at the specified index of the target array.
Parameters:
array: System.MessageBus.PortExtension[]
The one-dimensional Array that is the destination of the elements copied from PortExtensionCollection. The Array must have zero-based indexing.
index: System.Int32
The zero-based index in array at which copying begins.
Remarks:
The specified array must be of a compatible type.
Exceptions:
ArgumentNullException
array is a null reference.
ArgumentOutOfRangeException
index is less than 0.
ArgumentException
array is multi-dimensional.
InvalidCastException
The type of the destination array is not compatible with PortExtension.
public int IndexOf(PortExtension extension);
Searches for the specified PortExtension and returns the zero-based index of the first occurrence within the entire PortExtensionCollection.
Parameters:
extension: System.MessageBus.PortExtension
Return Value:
The zero-based index of the first occurrence of type within the entire PortExtensionCollection, if found; otherwise, −1.
public void Insert(int index, PortExtension extension);
Inserts a PortExtension into the PortExtensionCollection at the specified index.
Parameters:
index: System.Int32
Index into which to add the specified PortExtension.
extension: System.MessageBus.PortExtension
The PortExtension to insert.
Exceptions:
ArgumentOutOfRangeException
If index is less than zero or index is greater than Count.
protected override void OnClear( );
Performs additional custom processes when clearing the contents of the PortExtensionCollection instance.
Remarks:
The default implementation of this method is intended to be overridden by a derived class to perform some action before the collection is cleared.
protected override void OnInsert(int index, object obj);
Performs additional custom processes before inserting a new element into the PortExtensionCollection instance.
Parameters:
index: System.Int32
The zero-based index at which to insert obj.
obj: System.Object
The new value of the element at index.
Remarks:
The default implementation of this method is intended to be overridden by a derived class to perform some action before the specified element is inserted.
protected override void OnInsertComplete(int index, object obj);
Performs additional custom processing after inserting a new element into the PortExtensionCollection instance.
Parameters:
index: System.Int32
The zero-based index at which to insert obj.
obj: System.Object
The new value of the element at index.
Remarks:
The default implementation of this method is intended to be overridden by a derived class to perform some action after the specified element is inserted.
protected override void OnRemove(int index, object obj); Performs additional custom processes when removing an element from the PortExtensionCollection instance.
Parameters:
index: System.Int32
The zero-based index at which to insert obj.
obj: System.Object
The new value of the element at index.
protected override void OnRemoveComplete(int index, object obj);
Performs additional custom processes after removing an element from the PortExtensionCollection instance.
Parameters:
index: System.Int32
The zero-based index at which to insert obj.
obj: System.Object
The new value of the element at index.
Return Value:
The default implementation of this method is intended to be overridden by a derived class to perform some action after the specified element is removed.
protected override void OnSet(int index, object oldValue, object newValue);
Performs additional custom processes before setting a value in the PortExtensionCollection instance.
Parameters:
index: System.Int32
The zero-based index at which oldValue can be found.
oldValue: System.Object
The value to replace with newValue.
newValue: System.Object
The new value of the element at index.
Return Value:
The default implementation of this method is intended to be overridden by a derived class to perform some action before the specified element is set.
protected override void OnSetComplete(int index, object old Value, object new Value);
Performs additional custom processes after setting a value in the PortExtensionCollection instance.
Parameters:
index: System.Int32
The zero-based index at which oldValue can be found.
oldValue: System.Object
The value to replace with new Value.
newValue: System.Object
The new value of the element at index.
Return Value:
Performs additional custom processes after setting a value in the PortExtensionCollection instance.
protected override void OnValidate(object value);
Performs additional custom processes after setting a value in the CollectionBase instance.
Parameters:
value: System.Object
The object to validate.
Return Value:
Performs additional processing when the specified element is validated.
public void Remove(PortExtension extension);
Removes the first occurrence of the specified PortExtension from the PortExtensionCollection.
Parameters:
extension: System.MessageBus.PortExtension Pipeline Pipeline Class public class Pipeline: IMessageHandler ---
Constructors public Pipeline(IMessageHandler[] handlers);
Parameters:
    handlers: System.MessageBus.IMessageHandler[]
public Pipeline(IMessageHandler[] handlers, int offset, int length);
Parameters:
    handlers: System.MessageBus.IMessageHandler[]
    offset: System.Int32
    length: System.Int32

Properties public virtual bool CompletesSynchronously {get;}

Methods public virtual IAsyncResult BeginProcessMessage(Message message, AsyncCallback callback, object state);
Parameters:
    message: System.MessageBus.Message
    callback: System.AsyncCallback
    state: System.Object
public virtual bool EndProcessMessage(IAsyncResult result);
Parameters:
    result: System.IAsyncResult
public virtual bool ProcessMessage(Message message);
Parameters:
    message: System.MessageBus.Message
---

PipelineBuilder Class public class PipelineBuilder

A Pipeline factory. One issue with Pipeline s is that it can be difficult to calculate the correct ordering of IMessageHandler s without complete knowledge of the effects of each IMessageHandler on the Message. For instance, when a development team is building a set of IMessageHandler s, it can be difficult to understand the appropriate interleaving of the IMessageHandler s. PipelineBuilder facilitates this.

A PipelineBuilder takes a declarative description of the ordering of IMessageHandler s and builds a Pipeline with the IMessageHandler s in the correct order. Stage and StageAlias are used to describe the ordering of IMessageHandler s.

Here is an example. Assume that each Stage is named with a single letter. Assume that a StageAlias is written as {b, x, {x, e, f}}, where b is refined into {x, e, f}, and x is the placeholder for any IMessageHandler attached to b. (This StageAlias inserts two Stage s {e, f} after b.) Given:

Initial Stage s={a, b, c}
StageAlias es={b, x, {x, e, f}}, {c, y, {g, h, y}}, {x, z, {i, z, j}}
    Substituting the StageAlias es into the initial Stage s gives:
    Substitutes as {a, i, z, j, e, f, g, h, y}
    And resolving back to the original Stage s gives:
    Resolves as {a, i, b, j, e, f, g, h, c}

To build a Pipeline, a PipelineBuilder also needs to know which IMessageHandler s are associated with which Stage s. As an efficiency step, the relationship between IMessageHandler s and Stage s is encoded as a pair of arrays, where the ith IMessageHandler in the first array is associated with the ith Stage in the second array.

A PipelineBuilder may be used to create more than one Pipeline from the same description of Stage s. To make this efficient, the PipelineBuilder constructor takes the Stage information and ToPipeline creates the Pipeline s.

---
Constructors public PipelineBuilder(Stage[] stages, StageAlias[] aliases, Stage[] pipelineStages);
    Initializes a new instance of the PipelineBuilder class.
Parameters:
    stages: System.MessageBus.Stage[]
        An ordered list of initial, unique Stages.
    aliases: System.MessageBus.StageAlias[]
        A list of StageAliases.
    pipelineStages: System.MessageBus.Stage[]
        An ordered list of Stages that is parallel to the list of IMessageHandlers passed to ToPipeline.
Remarks:
    aliases may be an empty array.
    pipelineStages should not be empty. If it is, there will be no IMessageHandler s in the resulting Pipeline s.
    The PipelineBuilder may be used to create multiple Pipeline s that share the same ordered list of Stage s. Once created, there is no way to change the definition of Stage s within a PipelineBuilder. To do this, one must construct a new PipelineBuilder.
Exceptions:
    ArgumentNullException
        If stages, aliases, or pipelineStages is null.
    ArgumentException
        If any Stage in pipelineStages is not defined applying aliases to stages.
    ArgumentException
        If there are any duplicate Stage s.
    ArgumentException
        If any StageAlias in aliases recurses.

Methods public Pipeline ToPipeline(IMessageHandler[] handlers);
    Generates a Pipeline.
Parameters:
    handlers: System.MessageBus.IMessageHandler[]
        An ordered list of IMessageHandlers that must be parallel to the Stages passed to the constructor
Return Value:
    A Pipeline constructed according to the configuration of this instance of PipelineBuilder.
Remarks:
    ToPipeline takes a list of IMessageHandler s and creates a Pipeline. The items in this list of IMessageHandler s must be ordered in agreement with the Stage s passed to the constructor ("pipelineStages"); there must be exactly the same number of items in each list. The resulting Pipeline has exactly as many IMessageHandler s as are passed to ToPipeline, and these IMessageHandler s are in the order defined by the Stage s and StageAliases passed to the PipelineBuilder constructor.
Exceptions:
    ArgumentNullException
        If handlers is null.
    ArgumentException
        If handlers.Length != number of Stage s passed to the constructor as "pipelineStages".
---

Stage Class public class Stage

A well-defined placeholder in sequential Message processing in a Messaging Pipeline. A Stage represents a named, well-defined placeholder in sequential Message processing. A Stage has a unique name and is ordered within an array of Stages. To indicate the ordering of IMessageHandler s, each IMessageHandler is associated with exactly one Stage; to avoid ambiguity in the ordering, each Stage must have at most one associated IMessageHandler. A Stage may have no associated IMessageHandler; such unused Stages are eliminated when the PipelineBuilder constructs a Pipeline.

Other classes define sets of Stages that may be used (e.g., PortReceiveStages), but applications are free to define their own Stages to be used with a PipelineBuilder.

| Constructors |
|---|
| public Stage(Uri uri);<br>    Initializes a new instance of the Stage class.<br>    Parameters:<br>        uri: System.Uri<br>            The Uri that is the name of the Stage.<br>    Exceptions:<br>        ArgumentNullException<br>            If uri is null |

| Properties |
|---|
| public string Name {get;}<br>    Gets the name of the Stage. |

| Methods |
|---|
| public override bool Equals(object obj);<br>    Compares two Stages for equality.<br>    Parameters:<br>        obj: System.Object<br>            The Stage to compare to this instance.<br>    Return Value:<br>        true if obj is equal to this Stage instance; otherwise, false.<br>    Remarks:<br>        This overload enables the '==' and '!=' operators.<br>public override int GetHashCode( );<br>    A hash function for Stage.<br>    Remarks:<br>        This overload enables the '==' and '!=' operators. |

StageAlias Class public class StageAlias

Represents a refinement of one Stage into one or more other Stage s. To reduce the need for central coordination of Stage definitions, a Stage may be refined into one or more other Stage s, in effect providing finer-grained placeholders for sequential Message processing.

A StageAlias refines one Stage into a (potentially empty) array of Stage s. A StageAlias includes the original (to be refined) Stage, an array of new Stage s representing the refinement, and an optional indication of the placement of the original Stage within the order of the new Stage s.

If the original Stage is to be retained in the new array of Stage s, then exactly one of the new Stage s is marked as the placeholder, or alias, for the original Stage. (Thus the name "StageAlias" for the class.) If there is no alias in the new array of Stage s, then the original Stage is effectively deleted.

Including an alias in the new array of Stage s allows one to insert Stage s before and/or after the original Stage. Note that this allows inserting zero or more Stage s before a Stage, zero or more Stage s after, and/or deleting a Stage.

StageAliases may be chained or nested, where one StageAlias refines a Stage defined by another StageAlias. However, to avoid ambiguity in the overall Stage ordering, it is an error if the original Stage referenced by a StageAlias is not defined. Similarly, it is an error if more than one StageAlias attempts to refine the same Stage.

| Constructors |
|---|
| public StageAlias(Stage stage, Stage alias, Stage[] stages);<br>    Initializes a new instance of the StageAlias class.<br>Parameters:<br>    stage: System.MessageBus.Stage<br>        Original Stage to be refined<br>    alias: System.MessageBus.Stage<br>        The new Stage that indicates the relative position of stage in stages<br>    stages: System.MessageBus.Stage[]<br>        New array of Stages<br>Exceptions:<br>    ArgumentNullException<br>        If stage, alias, or stages are null |

| Properties |
|---|
| public Stage Alias {get;}<br>    Gets the placeholder Stage.<br>Property Value:<br>    The placeholder Stage.<br>Remarks:<br>    This Stage is in the new array of Stage s. The relative position of this Stage in the new array of Stage s indicates the relative position of any IMessageHandler attached to the original Stage.<br>public Stage Stage {get;}<br>    Gets the original Stage to be refined.<br>Property Value:<br>    The original Stage to be refined.<br>public Stage[] Stages {get;}<br>    Gets the new array of Stage s.<br>Property Value:<br>    The new array of Stage s. |

Send Channels

ISendChannel Interface public interface ISendChannel: IMassageHandler

| Methods |
|---|
| IAsyncResult BeginSend(Message message, AsyncCallback callback, object state);<br>    Asynchronous begin for Send.<br>Parameters:<br>    message: System.MessageBus.Message<br>        The Message to send.<br>    callback: System.AsyncCallback<br>        See Asynchronous Design Pattern.<br>    state: System.Object<br>        See Asynchronous Design Pattern.<br>Return Value:<br>    See Asynchronous Design Pattern.<br>void EndSend(IAsyncResult result);<br>    Asynchronous end for Send.<br>Parameters:<br>    result: System.IAsyncResult<br>        See Asynchronous Design Pattern.<br>Remarks:<br>    Note that Send "takes control" of a Message in the IMessageHandler sense. After a Message has been put into the SendChannel, it is no longer valid for inspecting (or closing).<br>void Send(Message message);<br>    Send a Message through the ISendChannel.<br>Parameters:<br>    message: System.MessageBus.Message<br>        The Message to send.<br>Remarks:<br>    Send is enabled when the Port is opened and disabled when the Port is closed. This is enforced by raising an exception.<br>    Note that Send "takes control" of a Message in the IMessageHandler sense. After a Message has been put into the SendChannel, it is no longer valid for inspecting (or closing). |

SendChannel Class public abstract class SendChannel: ISendChannel, IMessageHandler Send-only channel for Message s. A SendChannel implements a one-way send message exchange pattern. A Port may have many SendChannels; each is created by CreateSendChannel. A SendChannel may be created with a destination; all Message s sent on such a channel will be addressed to that destination; the SendChannel will automatically add a correctly formatted PathHeader, ReplyInfoHeader and ToHeader. Each Port has a SendChannel that is destination-agnostic. Any Message sent on that channel will need to be addressed through some other means (e.g., by explicitly adding a PathHeader, ReplyInfoHeader and ToHeader). A SendChannel may be created before or after a Port is opened. A SendChannel must not be created after a Port is closed; this is enforced by raising an exception.

EXAMPLES

Note that if a Message has more than one PathHeader, ReplyInfoHeader, or ToHeader, Send will raise an exception. This would happen if a SendChannel is created with a destination and a addressing information is added to the Message before it is sent.
// Port port;
// Message message;
// Uri destination;
// ToHeader toHeader;
message.Headers.Add(toHeader);
SendChannel sendChannel=port.CreateSendChannel (destination);
sendChannel.Send(Message);
// Exception Conversely, a Message sent on the Port's default Send-Channel (which is destination-agnostics) must already have a PathHeader, ReplyInfoHeader, and ToHeader. If no addressing headers are added, Send will raise an exception.

---

Constructors protected SendChannel( );

Properties public abstract bool CompletesSynchronously {get;}
    When overriden in a derived class, gets whether that implementation of SendChannel is inherently synchronous.
Property Value:
    true if the implementation of SendChannel is inherently synchronous; false otherwise.
Remarks:
    See IMessageHandler for more details.

Methods public abstract IAsyncResult BeginProcessMessage(Message message, AsyncCallback callback, object state);
    When overriden in a derived class, begins processing a Message being sent.
Parameters:
    message: System.MessageBus.Message
        The Message to process.
    callback: System.AsyncCallback
        See Asynchronous Design Pattern.
    state: System.Object
        See Asynchronous Design Pattern.
Return Value:
    See Asynchronous Design Pattern.
Remarks:
    See IMessageHandler for details on ProcessMessage.
public IAsyncResult BeginSend(Message message, AsyncCallback callback, object state);
    Asynchronous begin for Send.
Parameters:
    message: System.MessageBus.Message
        The Message to send.
    callback: System.AsyncCallback
        See Asynchronous Design Pattern.
    state: System.Object
        See Asynchronous Design Pattern.
Return Value:
    See Asynchronous Design Pattern.
Exceptions:
    InvalidOperationException -continued If Port is not open.
    ArgumentNullException
        If Message is null.
public abstract bool EndProcessMessage(IAsyncResult result);
    When overriden in a derived class, finishes processing a Message being sent.
Parameters:
    result: System.IAsyncResult
        See Asynchronous Design Pattern.
Return Value:
    true if the SendChannel has not and will not call Close ; otherwise, false.
Remarks:
    See IMessageHandler for details on ProcessMessage.
public void EndSend(IAsyncResult result);
    Asynchronous end for Send.
Parameters:
    result: System.IAsyncResult
        See Asynchronous Design Pattern.
Remarks:
    Note that Send "takes control" of a Message in the IMessageHandler sense. After a Message has been put into the SendChannel, it is no longer valid for inspecting (or closing).
public abstract bool ProcessMessage(Message message);
    When overriden in a derived class, processes a Message being sent.
Parameters:
    message: System.MessageBus.Message
        The Message to process.
Return Value:
    true if the SendChannel has not and will not call Close ; otherwise, false.
Remarks:
    See IMessageHandler for details on ProcessMessage.
public void Send(Message message);
    Send a Message out on the Port.
Parameters:
    message: System.MessageBus.Message
        The Message to send.
Remarks:
    Send is enabled when the Port is opened and disabled when the Port is closed. This is enforced by raising an exception.
    Note that Send "takes control" of a Message in the IMessageHandler sense. After a Message has been put into the SendChannel, it is no longer valid for inspecting (or closing).
Exceptions:
    InvalidOperationException
        If Port is not open.
    ArgumentNullException
        If Message is null.

---

SendMessageException Class

[Serializable] public class SendMessageException: SystemException

A SendMessageException is generated when an exception occurs during the receipt of a Message. Thread Safety:Single-threaded. To inspect the Exception that occured on sending the Message, inspect !InnerException. In order to inspect the Message that caused the Exception, inspect SentMessage.

---

Constructors public SendMessageException( );
    Initializes a new instance of the SendMessageException class.
public SendMessageException(Message message);
    Initializes a new instance of the SendMessageException class.
Parameters:
    message: System.MessageBus.Message
    The Message that caused the exception.
Exceptions:
    ArgumentNullException
        If message is null.
public SendMessageException(string s);
    Initializes a new instance of the SendMessageException class.

-continued

Parameters:
    s: System.String
        A description of the exception.
protected SendMessageException(SerializationInfo info, StreamingContext context);
    Initializes a new instance of the SendMessageException class with serialized data.
Parameters:
    info: System.Runtime.Serialization.SerializationInfo
        The SerializationInfo that holds the serialized object data about the exception being thrown.
    context: System.Runtime.Serialization.StreamingContext
        The StreamingContext that contains contextual information about the source or destination.
Exceptions:
    ArgumentNullException
        If info is null.
public SendMessageException(string s, Exception innerException);
    Initializes a new instance of the SendMessageException class.
Parameters:
    s: System.String
        A description of the exception.
    innerException: System.Exception
        The exception that was originally generated by the sending of the Message.
public SendMessageException(string s, Message message);
    Initializes a new instance of the SendMessageException class.
Parameters:
    s: System.String
        A description of the exception.
    message: System.MessageBus.Message
        The Message that caused the exception.
Exceptions:
    ArgumentNullException
        If message is null.
public SendMessageException(string s, Message message, Exception innerException);
    Initializes a new instance of the SendMessageException class.
Parameters:
    s: System.String
        A description of the exception.
    message: System.MessageBus.Message
        The Message that caused the exception.
    innerException: System.Exception
        The exception that was originally generated by the sending of the Message.
Exceptions:
    ArgumentNullException
        If message is null.

Properties public Message SentMessage {get;}
    Get the Message which caused the SendMessageException to be generated.
Property Value:
    The Message which caused the SendMessageException to be generated.

Methods public override void GetObjectData(SerializationInfo info, StreamingContext context);
    Sets the SerializationInfo with information about the exception.
Parameters:
    info: System.Runtime.Serialization.SerializationInfo
        The SerializationInfo that holds the serialized object data about the exception being thrown.
    context: System.Runtime.Serialization.StreamingContext
        The StreamingContext that contains contextual information about the source or destination.
Permissions:
    !SerializationFormatter
        The SerializationFormatter permission is necessary to serialize an exception.
Exceptions:
    ArgumentNullException
        If info is null.

EndpointNotFoundException Class
public class EndpointNotFoundException: IOException Constructors public EndpointNotFoundException( );
    Initializes a new instance of the EndpointNotFoundException class.
public EndpointNotFoundException(string message);
    Initializes a new instance of the EndpointNotFoundException class.
Parameters:
    message: System.String
        A description of the exception.
public EndpointNotFoundException(Uri uri);
    Initializes a new instance of the EndpointNotFoundException class.
Parameters:
    uri: System.Uri
        The Uri of the endpoint which could not be reached.
Exceptions:
    ArgumentNullException
        If uri is null.
protected EndpointNotFoundException(SerializationInfo info, StreamingContext context);
    Initializes a new instance of the EndpointNotFoundException class with serialized data.
Parameters:
    info: System.Runtime.Serialization.SerializationInfo
        The SerializationInfo that holds the serialized object data about the exception being thrown.
    context: System.Runtime.Serialization.StreamingContext
        The StreamingContext that contains contextual information about the source or destination.
Exceptions:
    ArgumentNullException
        If info is null.
public EndpointNotFoundException(string message, Exception innerException);
    Initializes a new instance of the EndpointNotFoundException class.
Parameters:
    message: System.String
        A description of the exception.
    innerException: System.Exception
        The exception that caused this exception to be generated.
public EndpointNotFoundException(string message, Uri uri);
    Initializes a new instance of the EndpointNotFoundException class.
Parameters:
    message: System.String
        A description of the exception.
    uri: System.Uri
        The Uri of the endpoint which could not be reached.
Exceptions:
    ArgumentNullException
        If uri is null.
public EndpointNotFoundException(string message, Uri uri, Exception innerException);
    Initializes a new instance of the EndpointNotFoundException class.
Parameters:
    message: System.String
        A description of the exception.
    uri: System.Uri
        The Uri of the endpoint which could not be reached.
    innerException: System.Exception
        The exception that caused this exception to be generated.
Exceptions:
    ArgumentNullException
        If uri is null.

Properties public Uri Endpoint {get;}
    Get the Uri of the endpoint which could not be reached.
Property Value:
    The Uri of the endpoint which could not be reached.

Methods public override void GetObjectData(SerializationInfo info, StreamingContext context);
    Sets the SerializationInfo with information about the exception.
Parameters:
    info: System.Runtime.Serialization.SerializationInfo -continued

```
        The SerializationInfo that holds the serialized object data
        about the exception being thrown.
      context: System.Runtime.Serialization.StreamingContext
        The StreamingContext that contains contextual information
        about the source or destination.
Permissions:
    !SerializationFormatter
        The SerializationFormatter permission is necessary to
    serialize an exception.
Exceptions:
    ArgumentNullException
        If info is null.
```

Receive Channels

ReceiveChannel Class public class ReceiveChannel: IMessageProducer

---

Constructors

```
public ReceiveChannel( );
```

Properties

```
public virtual IMessageHandler Handler {get; set;}
    Gets or sets the IMessageHandler to call on receipt of a Message.
```

ReceiveMessageException Class public class ReceiveMessageException: SystemException A ReceiveMessageException is generated when an exception occurs during the receipt of a Message. Thread Safety: Single-threaded. To inspect the Exception that occured on receiving the Message, inspect !InnerException. In order to inspect the Message that caused the Exception, inspect ReceivedMessage.

---

Constructors

```
public ReceiveMessageException( );
    Initializes a new instance of the ReceiveMessageException class.
public ReceiveMessageException(Message message);
    Initializes a new instance of the ReceiveMessageException class.
Parameters:
    message: System.MessageBus.Message
        The Message that caused the exception.
Exceptions:
    ArgumentNullException
        If message is null.
public ReceiveMessageException(string s);
    Initializes a new instance of the ReceiveMessageException
    class.
Parameters:
    s: System.String
        A description of the exception.
protected ReceiveMessageException(SerializationInfo info,
StreamingContext context);
    Initializes a new instance of the ReceiveMessageException class
with serialized data.
Parameters:
    info: System.Runtime.Serialization.SerializationInfo
        The SerializationInfo that holds the serialized object data
        about the exception being thrown.
    context: System.Runtime.Serialization.StreamingContext
        The StreamingContext that contains contextual information
        about the source or destination.
Exceptions:
    ArgumentNullException
        If info is null.
public ReceiveMessageException(string s, Exception innerException);
    Initializes a new instance of the ReceiveMessageException class.
```

-continued

```
Parameters:
    s: System.String
        A description of the exception.
    innerException: System.Exception
        The exception that was originally generated by the receipt of
        the Message.
public ReceiveMessageException(string s, Message message);
    Initializes a new instance of the ReceiveMessageException class.
Parameters:
    s: System.String
        A description of the exception.
    message: System.MessageBus.Message
        The Message that caused the exception.
Exceptions:
    ArgumentNullException
        If message is null.
public ReceiveMessageException(string s, Message message,
Exception innerException);
    Initializes a new instance of the ReceiveMessageException
    class.
Parameters:
    s: System.String
        A description of the exception.
    message: System.MessageBus.Message
        The Message that caused the exception.
    innerException: System.Exception
        The exception that was originally generated by the receipt of
        the Message.
Exceptions:
    ArgumentNullException
        If message is null.
```

Properties

```
public Message ReceivedMessage {get;}
    Get the Message which caused the ReceiveMessageException to be
    generated.
Property Value:
    The Message which caused the ReceiveMessageException to be
    generated.
```

Methods

```
public override void GetObjectData(SerializationInfo info,
StreamingContext context);
    Sets the SerializationInfo with information about the exception.
Parameters:
    info: System.Runtime.Serialization.SerializationInfo
        The SerializationInfo that holds the serialized object data
        about the exception being thrown.
    context: System.Runtime.Serialization.StreamingContext
        The StreamingContext that contains contextual information
        about the source or destination.
Permissions:
    !SerializationFormatter
        The SerializationFormatter permission is necessary to serialize an
    exception.
Exceptions:
    ArgumentNullException
        If info is null.
```

Example Computer Environment

Figure 8:
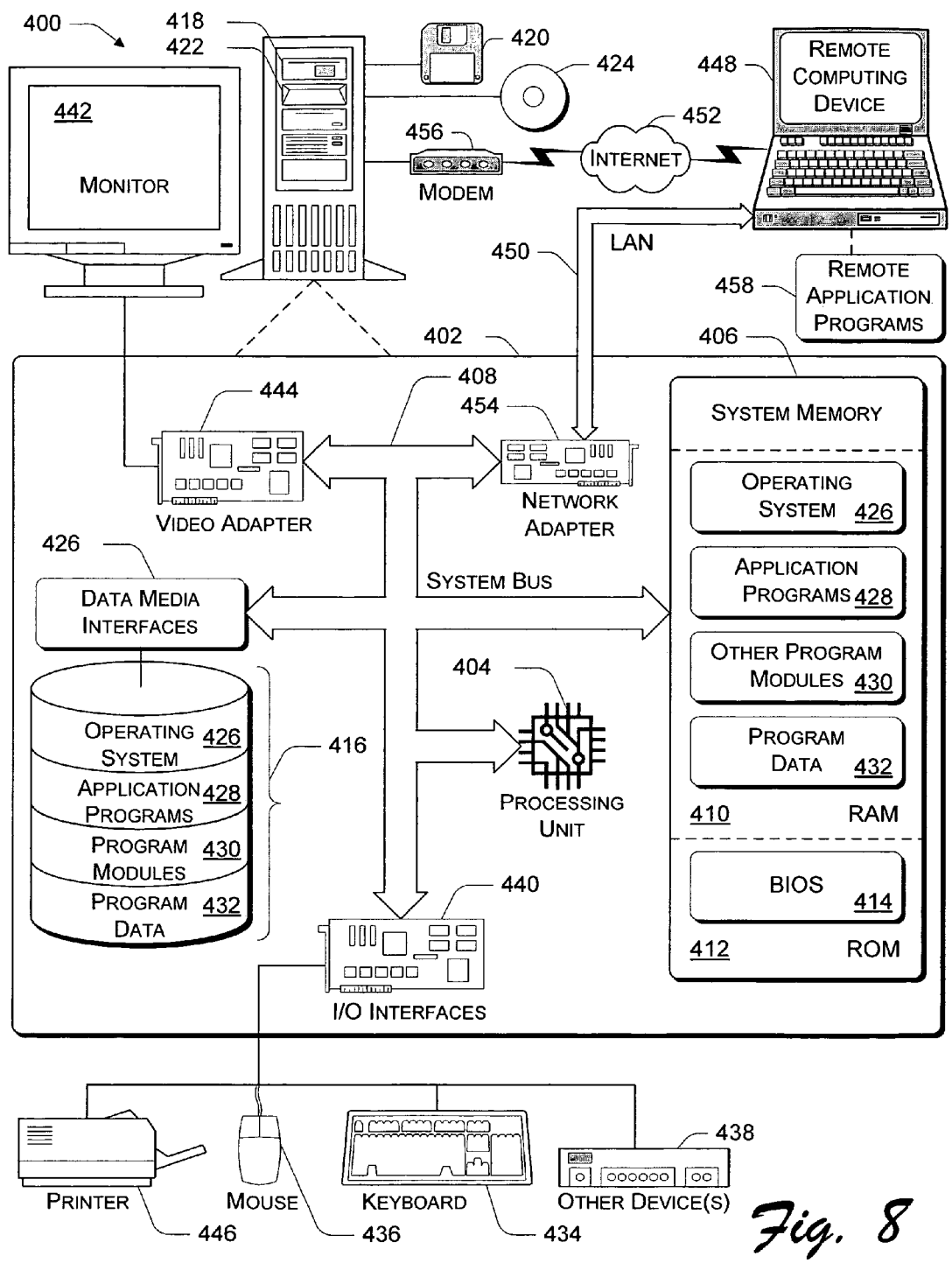
FIG. 8 illustrates an example of a general computer environment.

FIG. 8 illustrates an example of a general computer environment 400, which can be used to implement the techniques described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the example computer environment 400.

Computer environment 400 includes a general-purpose computing device in the form of a computer 402. In certain embodiments, computer 402 is used to implement application 103 and service 102 of FIG. 1, and/or application 105 and service 104 of FIG. 1. The components of computer 402 can include, but are not limited to, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 8 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are examples and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

One or more flowcharts are described herein and illustrated in the accompanying Figures. The ordering of acts in these flowchart(s) are examples only—these orderings can be changed so that the acts are performed in different orders and/or concurrently.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer readable storage media having stored thereon a plurality of instructions that, when executed by one or more processors of a device, causes the one or more processors to:
   provide an interface for a plurality of single-threaded message handlers, wherein the message handlers may be synchronous and/or asynchronous;
   identify a plurality of the message handlers available in an array in the interface that are to be included in a message handling pipeline of a service used to communicate with one or more other services, each of the plurality of message handlers being designed to operate on a message passed into the message handling pipeline;
   the identified plurality of message handlers including one or more extension handlers and one or more default message handlers, the one or more extension handlers having been designed separate from the design of the service that includes the one or more default message handlers
   build a stage to describe the ordering of the message handlers;
   reference at least two arrays encoding the relationship between the message handler and the stage and build a pipeline from the stage of identified and ordered message handler modules; and
   request that the pipeline be made available for use by applications run by the one or more processors, with messages passed into the pipeline being operated on based on the identified plurality of ordered message handlers.

2. One or more computer readable storage media as recited in claim 1, the identified plurality of message handlers including at least one but less than all of a group of default message handlers.

3. One or more computer readable storage media as recited in claim 1, the one or more other services being situated on a different device than the service.

4. One or more computer readable storage media as recited in claim 1, the plurality of instructions further causing the one or more processors to identify two or more message handlers that are to replace a default message handlers.

5. One or more computer readable storage media as recited in claim 1, the identified plurality of message handlers including one or more extension handlers.

6. One or more computer readable storage media as recited in claim 1, wherein each of the plurality of message handlers is implemented as a message handler object to:
   operate on the message in response to a process method exposed by the message handler object being invoked by a caller, the process method receiving as a parameter an identification of the message;
   if the message handler object consumes the message, then return, to the caller, a value indicating that the message handler object has consumed the message; and
   if the message handler object does not consume the message, then return, to the caller, a value indicating that the message handler object has finished operating on the message and that a second message handler object can operate on the message.

7. One or more computer readable storage media as recited in claim 1, wherein one or more of the plurality of message handlers operates on the messages passed into the pipeline using a buffered approach, and one or more other message handlers of the plurality of message handlers operates on the messages passed into the pipeline using a streaming approach.

8. A method comprising:
   receiving a message;
   identifying a single-threaded message handler in a pipeline of a service to operate on the message, the pipeline including one or more default message handlers and one or more extension message handlers and wherein the message handlers in the pipeline are less than all of the message handlers available for inclusion in the pipeline;
   each of the message handlers being implemented as a message handler object to:
      operate on the message in response to a process method exposed by the message handler object being invoked by a caller, the process method receiving as a parameter an identification of the message;
      if the message handler object consumes the message, then return, to the caller, a value indicating that the message handler object has consumed the message; and
      if the message handler object does not consume the message, then return, to the caller, a value indicating that the message handler object has finished operating on the message and that a second message handler object can operate on the message;
   invoking the identified message handler; and repeating the identifying and invoking until either all of the message handlers in the pipeline have operated on the message or one of the message handlers has consumed the message.

9. A method as recited in claim 8, the receiving comprising receiving the message from a service on a remote computing device.

10. A method as recited in claim 8, the method being implemented on a computer, and the receiving comprising receiving the message from a program running on the computer.

11. A method as recited in claim 8, wherein at least one of the message handlers in the pipeline operates on the message using a buffered approach, and at least one of the message handlers in the pipeline operates on the message using a streaming approach.

12. A system comprising:
a processor and computer readable storage media;
a service to allow one or more applications running on the system to communicate with one or more other systems wherein the service implements a class to:
  create an object exposing a first method that can be invoked by the one or more applications to allow the one or more applications to identify a first message handler to be added to a channel of a send pipeline or a receive pipeline; and
  add, in response to the first method being invoked, the identified first message handler to the channel;
the service including a port having a send pipeline to allow the one or more applications to send messages to the one or more other systems and a receive pipeline to allow the one or more applications to receive messages from the one or more other systems wherein each of the send pipeline and the receive pipeline are implemented as a plurality of message handler objects, each message handler object to:
  operate on one of the messages in response to a process method exposed by the message handler object being invoked by a caller, the process method receiving as a parameter an identification of the one message;
  if the message handler object consumes the one message, then return, to the caller, a value indicating that the message handler object has consumed the one message; and
  if the message handler object does not consume the one message, then return, to the caller, a value indicating that the message handler object has finished operating on the one message and that a second message handler object can operate on the one message; and
each of the send pipeline and the receive pipeline being configurable by the one or more applications to include functionality desired by the one or more applications and wherein the send pipeline and receive pipelines are configurable by allowing the one or more applications to identify particular single-threaded message handlers from a plurality of different single-threaded message handlers to be included in the pipeline, the different message handlers offering different functionality by operating on messages in the pipeline differently.

13. A system as recited in claim 12, the send pipeline and receive pipeline being configurable by allowing the one or more applications to identify one or more message handlers to replace a particular default message handler.

14. A system as recited in claim 12, wherein the send pipeline includes a first plurality of message handlers and the receive pipeline includes a second plurality of message handlers, each of the first and second plurality of message handlers including at least one message handler that processes messages using a buffered approach and at least one message handler that processes messages using a streaming approach.

* * * * *